US007775870B2

(12) United States Patent
Kelly et al.

(10) Patent No.: US 7,775,870 B2
(45) Date of Patent: *Aug. 17, 2010

(54) ARCADE GAME

(75) Inventors: Bryan M. Kelly, Alamo, CA (US); Norman B. Petermeier, Saratoga, CA (US); Matthew F. Kelly, Dublin, CA (US); J. Richard Oltmann, Scottsdale, AZ (US)

(73) Assignee: Sierra Design Group, Las Vegas, NV (US)

(*) Notice: Subject to any disclaimer, the term of this patent is extended or adjusted under 35 U.S.C. 154(b) by 1030 days.

This patent is subject to a terminal disclaimer.

(21) Appl. No.: 10/719,911

(22) Filed: Nov. 21, 2003

(65) Prior Publication Data

US 2005/0113159 A1 May 26, 2005

(51) Int. Cl.
*A63F 9/24* (2006.01)
*A63F 13/00* (2006.01)

(52) U.S. Cl. .................... 463/16; 463/1; 463/7; 463/42; 273/138.1; 273/138.2; 273/143 R

(58) Field of Classification Search ..................... 463/1, 463/7, 16, 23, 40–42; 273/138.1–138.2
See application file for complete search history.

(56) References Cited

U.S. PATENT DOCUMENTS

| | | | |
|---|---|---|---|
| 473,265 | A | 4/1892 | Reisky |
| 810,299 | A | 1/1906 | Pettee |
| 941,194 | A | 11/1909 | Hamilton |
| 1,543,318 | A | 6/1925 | M. Cardoza |
| 1,563,983 | A | 12/1925 | M. Higuchi |
| 1,652,071 | A | 12/1927 | Y. Tsujino |
| 1,879,511 | A | 9/1932 | Rodgers |
| 1,912,892 | A | 6/1933 | Eitzen |
| 1,987,449 | A | 6/1933 | Eitzen |

(Continued)

FOREIGN PATENT DOCUMENTS

| | | |
|---|---|---|
| AU | 79361/91 | 0/1992 |

(Continued)

OTHER PUBLICATIONS

Wikipedia, RS-232, Modified Mar. 7, 2007 [retrieved from Internet Mar. 15, 2007].*

(Continued)

*Primary Examiner*—John M Hotaling, II
*Assistant Examiner*—Ryan Hsu
(74) *Attorney, Agent, or Firm*—TIPSGroup

(57) ABSTRACT

An arcade game including a progressive bonus server connected to a plurality of individual game units. The progressive bonus server receives score contributions from each game unit to increase a progressive score. When players achieve a predetermined task on a game unit, they receive a non-monetary award based on the progressive score. Each game unit connected to the progressive bonus server may take the form of an arcade-type game with a rotating wheel on which to base scoring. A playing piece is directed down a playing surface towards a target end, and the wheel is rotated according to the target that was hit by the playing piece. The position of the wheel when it stops rotating affects the score. A non-monetary award based on the score is dispensed to the player when the game is completed.

14 Claims, 11 Drawing Sheets

U.S. PATENT DOCUMENTS 1,978,395 A 10/1934 Groetchen
2,010,213 A 8/1935 Bergoffen
2,141,580 A 12/1938 White
2,141,850 A * 12/1938 Adelbert .................... 451/133
2,187,362 A 1/1940 Plissner
2,545,644 A 1/1948 Wurzburger
2,660,434 A 11/1953 Durant
2,736,559 A 2/1956 Turner
2,926,915 A * 3/1960 Johns ......................... 273/352
3,232,622 A 2/1966 Lamberg
3,268,227 A 8/1966 Thatcher, Jr.
3,268,277 A 8/1966 Pratt et al.
3,273,571 A 9/1966 Seiden
3,275,324 A 9/1966 Burnside
3,275,325 A 9/1966 MacKenzie
3,285,380 A 11/1966 Sykes
3,349,584 A 10/1967 Russell et al.
3,362,712 A 1/1968 Wagner
3,429,574 A 2/1969 Williams
3,537,707 A 11/1970 Goldberg
3,584,877 A 6/1971 Florian
3,633,915 A 1/1972 Lippert
3,642,287 A 2/1972 Lally
3,684,290 A 8/1972 Wayne
3,733,075 A 5/1973 Hooker et al.
3,735,987 A 5/1973 Ohki
3,807,736 A 4/1974 Goldfarb
3,819,186 A 6/1974 Hinterstocker
3,834,712 A 9/1974 Cox
3,841,637 A 10/1974 Piazza
3,843,129 A 10/1974 Dietrich
3,851,879 A 12/1974 Hicks
3,947,030 A 3/1976 Goldfarb et al.
3,975,022 A 8/1976 Figueroa
4,051,939 A 10/1977 Murphy et al.
4,058,026 A 11/1977 Simpson
4,071,246 A 1/1978 Hooker
4,095,795 A 6/1978 Saxton et al.
4,101,129 A 7/1978 Cox
4,120,501 A 10/1978 Atherton
4,149,728 A 4/1979 Thompson
4,157,828 A 6/1979 Cosmopulos
4,177,996 A 12/1979 Chang
4,184,683 A 1/1980 Hooker
4,198,052 A 4/1980 Gauselmann
4,200,896 A 4/1980 Baumann
4,212,465 A 7/1980 Arad
4,213,524 A 7/1980 Miyashita et al.
4,216,961 A 8/1980 McQuillan
4,227,690 A 10/1980 Pitkanen
4,238,127 A 12/1980 Lucero et al.
4,240,635 A 12/1980 Brown
4,260,153 A 4/1981 Nishimiya
4,321,673 A 3/1982 Hawwass et al.
4,326,351 A 4/1982 Heywood et al.
4,348,028 A 9/1982 Barlow
4,353,554 A 10/1982 Fisher
4,357,015 A 11/1982 Santora et al.
4,373,727 A 2/1983 Hooker et al.
4,383,884 A 5/1983 Rozmus
4,385,847 A 5/1983 Avison
4,396,193 A 8/1983 Reinhardt et al.
4,397,463 A 8/1983 Moscovich
4,410,178 A 10/1983 Partridge
D272,920 S 3/1984 Wichinsky et al.
4,448,419 A 5/1984 Telnaes
4,458,185 A 7/1984 Matty et al.
4,492,378 A 1/1985 Williams
4,492,379 A 1/1985 Okada
4,496,160 A 1/1985 Wichinsky et al.
D278,069 S 3/1985 Wichinsky et al.
4,504,158 A 3/1985 Ciampi et al.
4,508,345 A 4/1985 Okada
4,509,754 A 4/1985 Remmler et al.
4,515,366 A 5/1985 Hamano
4,519,522 A 5/1985 McElwee
4,534,560 A 8/1985 Okada
4,541,746 A 9/1985 Bobart et al.
4,560,171 A 12/1985 Anthony
4,569,522 A 2/1986 Davies
4,572,509 A * 2/1986 Sitrick ......................... 463/31
4,573,681 A 3/1986 Okada
4,602,789 A 7/1986 Chung
4,618,150 A 10/1986 Kimura
4,624,459 A 11/1986 Kaufman
4,635,937 A 1/1987 Dickinson et al.
4,643,425 A 2/1987 Herzenberger
4,648,600 A 3/1987 Olliges
4,657,256 A 4/1987 Okada
4,660,833 A 4/1987 Dickinson et al.
4,662,846 A 5/1987 Quercetti
4,669,731 A 6/1987 Clarke
4,676,506 A 6/1987 Crouch
4,687,981 A 8/1987 Okada
4,695,053 A 9/1987 Vazquez, Jr. et al.
4,700,948 A 10/1987 Okada
4,701,056 A 10/1987 Barlow
4,711,451 A 12/1987 Pajak et al.
4,718,672 A 1/1988 Okada
4,721,307 A 1/1988 Okada
4,732,386 A 3/1988 Rayfiel
4,732,391 A 3/1988 Karr
4,741,532 A 5/1988 Okada
4,743,024 A * 5/1988 Helm et al. ............. 273/143 R
4,753,625 A 6/1988 Okada
4,756,531 A 7/1988 Dire et al.
4,772,023 A 9/1988 Okada
4,772,024 A 9/1988 Werner
4,773,647 A 9/1988 Okada et al.
4,790,537 A 12/1988 Smyth et al.
4,792,137 A 12/1988 McKechnie
4,821,863 A 4/1989 Okada
4,822,318 A 4/1989 Okada
4,826,169 A 5/1989 Bessho et al.
4,837,728 A * 6/1989 Barrie et al. .................. 463/27
4,844,467 A 7/1989 Gyenge et al.
4,848,768 A 7/1989 Barlow
4,852,885 A 8/1989 Baratpour et al.
4,858,932 A 8/1989 Keane
4,861,041 A 8/1989 Jones et al.
4,871,171 A 10/1989 Rivero
4,874,173 A 10/1989 Kishishita
4,889,339 A 12/1989 Okada
4,892,311 A 1/1990 Zaitsu
4,906,005 A 3/1990 Manabe
4,911,449 A 3/1990 Dickinson et al.
4,912,389 A 3/1990 Eguchi
4,930,779 A 6/1990 Maddox
4,948,133 A 8/1990 Helm et al.
4,957,296 A 9/1990 Turnidge et al.
4,961,655 A 10/1990 Saito
4,964,638 A * 10/1990 Ishida ......................... 463/27
4,989,878 A 2/1991 Davies
4,991,848 A 2/1991 Greenwood et al.
5,002,279 A 3/1991 Kaminkow et al.
5,004,238 A 4/1991 Okada
5,010,995 A 4/1991 Okada
5,014,988 A 5/1991 Mirando et al.
5,014,991 A 5/1991 Mirando et al.
5,016,880 A * 5/1991 Berge ......................... 463/27
5,018,737 A 5/1991 Okada
5,024,439 A 6/1991 Okada
5,024,441 A 6/1991 Rousseau
5,031,911 A 7/1991 Okada 5,042,810 A 8/1991 Williams
5,042,813 A 8/1991 Huang
5,043,887 A * 8/1991 Richardson .................. 463/19
5,048,833 A 9/1991 Lamle
5,050,881 A 9/1991 Nagao
5,058,893 A 10/1991 Dickinson et al.
5,066,014 A 11/1991 Dobson
5,067,712 A 11/1991 Georgilas
5,071,127 A 12/1991 Bromley et al.
5,074,559 A 12/1991 Okada
5,077,462 A 12/1991 Newell et al.
5,078,399 A * 1/1992 Lennon, Jr. .................. 463/47
5,078,405 A 1/1992 Jones et al.
5,083,785 A 1/1992 Okada
5,085,436 A 2/1992 Bennett
5,096,192 A 3/1992 Stanford, Jr.
5,096,196 A 3/1992 Gutknecht et al.
5,102,134 A 4/1992 Smyth
5,102,135 A 4/1992 Addiechi
5,102,136 A 4/1992 Heidel et al.
5,102,137 A 4/1992 Ekiert
5,102,138 A 4/1992 Johnson
5,106,091 A 4/1992 Comito
5,116,055 A 5/1992 Tracy
5,127,651 A 7/1992 Okada
5,137,278 A 8/1992 Schilling et al.
5,149,093 A 9/1992 Schilling et al.
5,152,529 A 10/1992 Okada
5,154,421 A 10/1992 Hamano
5,167,413 A 12/1992 Fulton
5,178,390 A 1/1993 Okada
5,181,722 A 1/1993 Krutsch et al.
D332,976 S 2/1993 Gutknecht et al.
5,184,821 A * 2/1993 Korenek .................. 273/138.2
5,188,363 A 2/1993 Marnell, II et al.
5,205,555 A 4/1993 Hamano
5,209,479 A 5/1993 Nagao et al.
5,219,167 A 6/1993 Hamano
5,249,800 A 10/1993 Hilgendorf et al.
5,251,898 A 10/1993 Dickenson et al.
5,259,613 A * 11/1993 Marnell, II .................. 463/42
5,259,616 A 11/1993 Bergmann
5,280,909 A 1/1994 Tracy
5,286,023 A 2/1994 Wood
5,292,127 A * 3/1994 Kelly et al. ............. 273/118 A
5,318,298 A 6/1994 Kelly et al.
5,342,049 A 8/1994 Wichinsky et al.
5,344,144 A 9/1994 Canon
5,344,145 A 9/1994 Chadwick et al.
5,362,052 A 11/1994 Kubatsch
5,370,306 A 12/1994 Schulze et al.
5,374,061 A 12/1994 Albrecht
5,380,008 A 1/1995 Mathis et al.
5,385,347 A 1/1995 Halliburton
5,393,057 A 2/1995 Marnell, II
5,393,061 A 2/1995 Manship et al.
5,401,024 A 3/1995 Simunek
5,409,225 A * 4/1995 Kelly et al. ............. 273/118 A
5,411,271 A 5/1995 Mirando
5,429,361 A 7/1995 Raven et al.
5,486,005 A 1/1996 Neal
5,540,442 A 7/1996 Orselli et al.
5,700,007 A 12/1997 Kelly et al.
5,733,193 A * 3/1998 Allard et al. ................... 463/8
5,743,523 A 4/1998 Kelly et al.
5,779,549 A 7/1998 Walker et al.
5,788,573 A 8/1998 Baerlocher et al.
5,816,918 A * 10/1998 Kelly et al. ................... 463/16
5,839,957 A 11/1998 Schneider et al.
5,848,932 A 12/1998 Adams
5,855,516 A * 1/1999 Eiba ............................ 463/42
5,882,258 A * 3/1999 Kelly et al. ................... 463/11
5,882,261 A 3/1999 Adams
5,911,418 A 6/1999 Adams
5,967,514 A * 10/1999 Kelly et al. .............. 273/138.1
6,244,595 B1 * 6/2001 Kelly et al. .............. 273/138.1
6,446,964 B1 * 9/2002 Kelly et al. .............. 273/138.1
6,491,296 B2 12/2002 Kelly et al.
6,692,360 B2 * 2/2004 Kusuda et al. ................ 463/42
6,827,646 B2 12/2004 Adams
7,100,916 B2 9/2006 Kelly et al.
7,278,635 B2 10/2007 Kelly et al.
2002/0017756 A1 2/2002 Kelly et al.
2003/0015838 A1 1/2003 Kelly et al.
2005/0073091 A1 4/2005 Kelly et al.

FOREIGN PATENT DOCUMENTS

AU 39332/78 3/1980
AU 75789/81 4/1982
AU 21070/92 8/1992
AU 80248/91 12/1992
AU 24895/92 5/1995
DE 2252053 5/1974
DE 2824863 11/1979
DE 2824863 B1 11/1979
DE 7931812 U 2/1980
DE 2838339 A1 3/1980
DE 2909527 B1 6/1980
DE 30 35 898 4/1982
DE 30 35 947 5/1982
DE 3044243 5/1982
DE 3105266 9/1982
DE 3105266 A1 9/1982
DE 31 39 587 4/1983
DE 32 13 400 10/1983
DE 3229673 A1 2/1984
DE 33 34 474 4/1984
DE 3347508 7/1985
DE 34 15 114 10/1985
DE 3424383 A1 1/1986
DE 34 39 635 4/1986
DE 3439636 4/1986
DE 34 38 573 5/1986
DE 3436783 5/1986
DE 34 44 148 6/1986
DE 29 38 307 7/1987
DE 3601631 7/1987
DE 3601824 A1 7/1987
DE 37 03 548 3/1988
DE 36 38 099 5/1988
DE 3700861 7/1988
DE 37 01 622 8/1988
DE 3709026 9/1988
DE 3726495 2/1989
DE 30 44 243 3/1989
DE 3738120 5/1989
DE 3738120 A1 5/1989
DE 3811301 10/1989
DE 38 22 636 1/1990
DE 38 25 183 2/1990
DE 38 30 648 3/1990
DE 3831740 3/1990
DE 39 15 655 11/1990
DE 3917684 12/1990
DE 4014477 7/1991
DE 40 36 728 5/1992
DE 42 38 896 5/1992
DE 41 43 128 1/1993
DE 33 47 508 3/1993
DE 41 28 633 3/1993
DE 37 26 495 4/1993
DE 41 33 273 4/1993
DE 34 36 783 7/1993
DE 42 01 534 7/1993
DE 42 11 438 10/1993

| | | | |
|---|---|---|---|
| DE | 42 11 440 | | 10/1993 |
| DE | 42 11 443 | | 10/1993 |
| DE | 42 20 132 | | 12/1993 |
| DE | 42 26 091 | | 2/1994 |
| DE | 42 26 874 | | 2/1994 |
| DE | 42 31 086 | | 3/1994 |
| DE | 42 32 762 | | 3/1994 |
| DE | 43 01 855 | | 7/1994 |
| DE | 43 31 257 | | 1/1995 |
| EP | 0 062 433 | | 10/1982 |
| EP | 0 219 305 | | 10/1986 |
| EP | 0 281 402 | | 3/1988 |
| EP | 0 338 743 | | 10/1989 |
| EP | 0577415 | A2 | 1/1994 |
| EP | 0577415 | A3 | 1/1994 |
| EP | 0603230 | | 6/1994 |
| EP | 0603230 | B1 | 6/1994 |
| ES | 529535 | | 6/1983 |
| ES | 529536 | | 6/1983 |
| ES | U 8601125 | | 11/1986 |
| ES | U 8703519 | | 11/1987 |
| ES | U 8703530 | | 11/1987 |
| ES | U 8701723 | | 6/1988 |
| ES | U 8701028 | | 3/1989 |
| ES | 2006400 | | 4/1989 |
| ES | 2006401 | | 4/1989 |
| ES | 2013885 | | 6/1990 |
| ES | 2016168 | | 10/1990 |
| ES | 2018982 | | 5/1991 |
| ES | 2047436 | | 2/1994 |
| ES | 2047437 | | 2/1994 |
| FR | 1 474 617 | | 2/1967 |
| GB | 371199 | | 4/1932 |
| GB | 912685 | | 12/1962 |
| GB | 1242298 | | 8/1971 |
| GB | 1428157 | | 3/1976 |
| GB | 1430007 | | 3/1976 |
| GB | 1444085 | | 7/1976 |
| GB | 1464896 | | 6/1977 |
| GB | 1476848 | | 6/1977 |
| GB | 1550732 | | 8/1979 |
| GB | 2066991 | | 7/1981 |
| GB | 2072395 | | 9/1981 |
| GB | 2081952 | A | 2/1982 |
| GB | 2083936 | | 3/1982 |
| GB | 2084371 | | 4/1982 |
| GB | 2086632 | | 5/1982 |
| GB | 2092797 | A | 8/1982 |
| GB | 2 096 376 | | 10/1982 |
| GB | 2097160 | A | 10/1982 |
| GB | 2098779 | | 11/1982 |
| GB | 2101380 | | 1/1983 |
| GB | 2105891 | | 3/1983 |
| GB | 2106292 | A | 4/1983 |
| GB | 2106292 | A | 4/1983 |
| GB | 2106685 | | 4/1983 |
| GB | 2133994 | | 8/1984 |
| GB | 2137392 | | 10/1984 |
| GB | 2152262 | | 7/1985 |
| GB | 2153572 | | 8/1985 |
| GB | 2169737 | | 7/1986 |
| GB | 2170636 | | 8/1986 |
| GB | 2170937 | | 8/1986 |
| GB | 2170938 | | 8/1986 |
| GB | 2180682 | | 4/1987 |
| GB | 2181589 | | 4/1987 |
| GB | 2182186 | | 5/1987 |
| GB | 2191030 | | 12/1987 |
| GB | 2193025 | | 1/1988 |
| GB | 2197974 | | 6/1988 |
| GB | 2 201 821 | | 9/1988 |
| GB | 2201821 | | 9/1988 |
| GB | 2202984 | | 10/1988 |
| GB | 2204436 | | 11/1988 |
| GB | 2210191 | | 6/1989 |
| GB | 2216322 | | 10/1989 |
| GB | 2218558 | | 11/1989 |
| GB | 2222712 | | 3/1990 |
| GB | 2230373 | | 10/1990 |
| GB | 2233806 | A | 1/1991 |
| GB | 2242300 | | 9/1991 |
| GB | 2253300 | A | 9/1992 |
| GB | 2262642 | | 6/1993 |
| GB | 2268415 | A | 1/1994 |
| GB | 2273384 | | 6/1994 |
| GB | 2268415 | A | 12/1994 |
| GB | 1464896 | | 2/1997 |
| JP | 49105640 | | 10/1974 |
| JP | 5955272 | | 3/1984 |
| JP | 59-193487 | | 12/1984 |
| JP | 60-227787 | | 11/1985 |
| JP | 62-253091 | | 11/1987 |
| JP | 62-254786 | | 11/1987 |
| JP | 3-136683 | | 6/1991 |
| JP | 5-131044 | | 5/1993 |
| JP | 5-131045 | | 5/1993 |
| JP | 5-131046 | | 5/1993 |
| JP | 5237217 | | 9/1993 |
| JP | 5-285252 | | 11/1993 |
| JP | 6-2177 | | 1/1994 |
| JP | 6-7498 | | 1/1994 |
| JP | 6-190114 | | 7/1994 |
| JP | 6-254208 | | 9/1994 |
| NL | 9200335 | | 9/1992 |
| WO | WO 82/01611 | | 5/1982 |
| WO | WO 91/17529 | | 11/1991 |
| WO | WO 93/05484 | | 3/1993 |
| WO | WO 9836809 | | 8/1998 |

OTHER PUBLICATIONS

Cyclone Pinball by Williams 1998 at www.pinballrebel.com, downloaded from website http://www.pinballrebel.com/game/pins/cycline/cyclone_pinball.htm, printed on Apr. 18, 2007 (19 pages).
Cyclone Parts Information Manual, Mar. 1988, IGT1004716-IGT1004737 (22 pages).
Cyclone, Williams Electronics Games, Inc., IGT1004585 (1 page).
Cyclone, "It'll Blow You Away," IGT1004586 (1 page).
Pinball Archive Rule Sheet: Cyclone, IGT1004633-IGT1004636, (4 pages).
Cyclone Operations Manual, Feb. 1988 (66 pages).
Bally Speakeasy Installation and General Game Operation Instructions, IGT1010170-IGT 1010208 (39 pages).
Riverboat Gambler Pinball of 1990 by Williams at www.pinballrebel.com, IGT1008872-IGT1008879 (8 pages).
Pinball Archive Rule Sheet: Riverboat Gambler IGT1008880-IGT1008893, (14 pages).
Amendment, Riverboat Gambler Operations Manual, IGT1008894-IGT1008910, (17 pages).
The Internet Pinball Machine Database, Riverboat Gambler/IPD No. 1966/Nov. 1990,/4 players, from website http://ipdb.org/search.pl?any=Riverboat+&sortby+name&searchtype+1 . . . , printed on Jan. 4, 2007 (2 pages).
Riverboat Gambler Rulesheet, HTML Version 1.53, Scott Piehler, IGT1010074-IGT1010098 (25 pages).
Riverboat Gambler Rulesheet v.2.93, from website http://www.ipdb.org/rulesheets/1966/RGAMBER.TXT, printed on Jan. 4, 2007, IGT1010099-IGT1010115 (17 pages).
Riverboat Gambler Quick-Take, from website http://www.ipdb.org/rulesheets/1966/RGAMBOT.TXT, printed on Jan. 4, 2007, IGT1010116-IGT1010117 (2 pages).
Amendment, Riverboat Gambler Operations Manual, IGT1010133-IGT1010134 (2 pages).
Internet Pinball Database: Williams 'Riverboat Gambler,' IGT1008834-IGT1008836 (3 pages).

The Internet Pinball Machine Database from website http://ipdb/org/search,pl?any=Bad+Cats&search=Search+Database&sea . . . printed on Jan. 4, 2007, IGT1009847-IGT1009849 (3 pages).
Bad Cats Rulesheet Version 1.01 by Bill Ung, from website http://www.ipdb.org/rulesheets/127/badcats.htm, printed on Jan. 4, 2007, IGT1009850-IGT1009856 (7 pages).
Internet Pinball Database: Williams 'Bad Cats', IGT1010162-IGT1010163 (2 pages).
Pinball Archive Rule Sheet: Bad Cats, IGT1010164-IGT1010169 (7 pages).
Bad Cats Operations Manual, Nov. 1989, IGT1009857-IGT1009903 (47 pages).
Davis, Bradley, "Mastering Joker Wild Video Poker," Applied Technology Press, IGT1004213-IGT1004216 (4 pages).
EuroSlot, Jun. 1992, front page, contents page, 2 additional pages IGT1004427-IGT1004430 (4 pages).
JPK Royal 50, undated, IGT1004365-IGT1004366 (2 pages).
Fey, Marshall, The Complete Service Manual for Series E 1980-1986, Liberty Belle Books, Front page, Contents page, and one additional page, IGT1007394-IGT1007396 (3 pages).
Smokin' Token, Seidel Amusement Machine Co., Inc., undated, IGT1005199-IGT1005200 (2 pages).
RePlay Magazine, Spotlight Special, "Wanna Hook Onto a Tavern Hit? Call Your Benchmark Distributor," Feb. 1996, IGT1005206-IGT1005209 (4 pages).
Convoy Operators Manual, Taito Corporation, undated, IGT1005249-IGT1005272 (24 pages).
Fey, Marshall, "*Bally* Slot Machines," Cover page and one additional page, IGT1007397-IGT1007398 (2 pages).
Document showing Bromley's Line of Family Entertainment, undated, IGT1005211-IGT1005212 (2 pages).
Document showing "Circus Roll," undated, IGT1005213 (1 page).
Document showing "Claim Jumper," undated, IGT1005214 (1 page).
Document showing games from Benchmark Games, Inc., undated, IGT1005205 (1 page).
Document showing "Caribbean Hook," undated, IGT1005210 (1 page).
Document showing "Dozers," undated, IGT1005201 (1 page).
Document showing "Cheese Chase", undated, IGT1005215 (1 page).
Document showing "Lot-o-Fun," undated, IGT1005220 (1 page).
Document showing "Pirates Revenue," undated, IGT1005221 (1 page).
Document showing "Redemption Income," undated, IGT1005222 (1 page).
Document showing "Convoy," undated, IGT1005248 (1 page).
Document showing "Over the Rainbow," undated, IGT1005276 (1 page).
Document showing "Double Cheese," undated, IGT1005275 (1 page).
KLOV, "Killer List of Video Games," from website http://www.klov.com/game_detail.php?game_id=7616, printed on Oct. 3, 2006, IGT1005273-IGT1005274 (2 pages).
FiveStarRedemption Products Page, from website http://www.firestarredemption.com/products.htm printed on Oct. 3, 2006, IGT1005216-IGT1005217 (2 pages).
Games, from website http://www.greatersouther.com/manufacturers/baytek.html, printed on Oct. 3, 2006, IGT1005242-IGT1005247 (6 pages).
Document showing "Vegas and Club Reno," undated, IGT1004364 (1 page).
Document showing "Lucky Strike," undated, IGT1004452 (1 page).
Document showing "Lucky Strike," undated, IGT1004453 (1 page).
Fey, Marshall "Slot Machines—A Pictorial History of the First 100 Years," Fourth Edition, published by Liberty Belle Books, 1994, cover and pp. 1, 6, 17, 19-20, 30-32, 34, 68, 70-73, 77-79, 86-88, 90, 92-93, 96, 98-99, 128, 150, 154, 158-159, 230, 232-234 and 237.
Document showing "Sidewinder," undated, IGT1004330-IGT1004331 (2 pages).
"What is PLUS Lotto?" from website http://www.pluslotto.com/newpl_content.asp?page+who&sid=249FA55424D1F&cr=151018, printed on Feb. 28, 2000, IGT1004357 (2 pages).
Robert N. Geddes, Slot Machines on Parade (Mead 1980), IGT1004408-IGT1004426 (19 pages).
Wheel of Fortune (Project Coin): Jul. 13, 2000 letter from Michael Broaddus to Steven Daniels regarding 1992 Wheel of Fortune game, IGT1004320-IGT1004321 (2 pages).
Document showing "Wheel of Fortune" game, undated, IGT1004322-IGT1004327 (6 pages).
Coin Slot International, Feb. 14, 1992, IGT1004318-IGT1004319 (2 pages).
Document showing "Twist 'n' Shout," undated, IGT1004454-IGT1004455 (2 pages).
"Player's Edge Plus Domestic Video Poker," Program Reference Guide, International Game Technology, Jul. 1, 1988, IGt1004290-1GT1004299 (10 pages).
Document showing "Jive Time," undated, IGT1006772 (1 page).
Document showing "Ticket Track," undated, IGT1005202 (1 page).
Document showing "Quack Attack," undated, IGT1005203-IGT1005304 (2 pages).
Document showing "Slam Ramp," undated, IGT1005218 (1 page).
Document showing "No-Good Golfers," undated, IGT1005219 (1 page).
Document showing 'Bad Cats', Upper Playfield, from website http://ipdb.org/showpic.pl?id=127&picno+9839, printed Jan. 4, 2007, IGT1009917 (1 page).
Document showing 'Bad Cats', Center Playfield, from website http://ipdb.org/showpic.pl?id=127&picno+9840, printed Jan. 4, 2007, IGT1009918 (1 page).
Document showing Bad Cats, Lower Playfield, from website http://ipdb.org/showpic.pl?id=127&picno+9841, printed Jan. 4, 2007, IGT1009919 (1 page).
Document showing 'Bad Cats', Backglass Animation Detail, from website http://ipdb.org/showpic.pl?id=127&picno+9843, printed Jan. 4, 2007, IGT1009920 (1 page).
Document showing 'Bad Cats', Playfield, from website http://ipdb.org/showpic.pl?id=127&picno+28928, printed Jan. 4, 2007, IGT1009921 (1 page).
Document showing 'Riverboat Gambler', Production Translite, from website http://ipdb.org/showpick.pl?id=1966&picno=18626, printed Jan. 4, 2007, IGT1010135 (1 page).
Document showing 'Riverboat Gambler', Duratrans Prototype, from website http://ipdb.org/showpick.pl?id=1966&picno=18627, printed Jan. 4, 2007, IGT1010136 (1 page).
Document showing 'Riverboat Gambler', Playfield, from website http://ipdb.org/showpick.pl?id=1966&picno=14863, printed Jan. 4, 2007, IGT1010137 (1 page).
Document showing "Riverboat Gambler", Backglass, from website http://ipdb.org/showpick.pl?id=1966&picno=19491, printed Jan. 4, 2007, IGT1010138 (1 page).
Document showing Beat the Clock, undated, IGT1010301-IGT1010302 (2 pages).
Document showing "Cyclone," undated, IGT1004645-IGT1004649 (5 pages).
Melton, Wayne, "Giant Machines Reap Gamblers," Reno Gazette-Journal, Feb. 24, 1992, IGT1007383 (1 page).
IGT's Disclosures Pursuant to Paragraph 3(b) of the Joint Discovery Plan and Scheduling Order (with Exhibits 1-15).
*Bally* v. *IGT*, Primary Prior art Cited in IGT's Invalidity Contentions—Claim Charts.
*IGT* v. *Alliance Gaming Corporation*, Claim Construction—Order; Case 2:04-cv-01676-RCJ-RJJ, Document 425, Filed May 9, 2007, 83 pages.
Exhibit A. Photographs of alleged slot machines at New Jersey Shore that may have been "skilled slot machine games" or arcade skill stop games. 1991.
"Gambling Devices Act of 1962," Title 15, U.S. Code, .sctn.1171-1177, Section .sctn.1171.
"Legalized Games of Chance Control Commission," Statutes & Regulations Governing Conduct of Amusement Games, Feb. 1993, pp. D362-D376.
"Sidewinder," Bob's Space Racer, Inc. 1991, 1993, pp. D380-D381.
Amended Certification of Amusement Game, New Jersey Dept. of Law and Public Safety, Division of Alcoholic Bev. Control, Bureau of Amusement Games Control, Jun. 30, 1988.

Certification of Amusement Game, New Jersey Dept. of Law and Public Safety, Division of Alcoholic Bev. Control, Bureau of Amusement Games Control, Mar. 30, 1988.
Request for Certification, State of New Jersey, Dept. of Law and Public Safety, Division of Alcoholic Bev. Control, Bureau of Amusement Games, Control, Mar. 22, 1988.
"Player's Edge Plus Domestic Video Poker-Program Reference Guide," (Part Number: 821-039-00 Rev. A), International Game Technology (IGT) (1988), pp. 3-8, 3-9, 3-10, 3-11, 3-13, 3-1, 3-2.
"Player's Edge Plus Series -Field Service Manual, "(Part Number: 821-037-00 Rev. A), International Game Technology (IGT) (1989), pp. 1-1, 1-2, 2-3, 2-10, 2-12, 2-13, 5-23-5-25, C-12, D-16.
John Gollehon, "All About Slots and Video Poker" Perigee Books, (1988), pp. 39, 42, 43.
John Scarne, "Scarne's Encyclopedia of Games," Harper & Row, New York, NY (1973), pp. ix, x, xii, 7, 48.
John Scarne, "Scarne's Guide to Modern Poker," Simon & Schuster, New York, NY (1980), pp. 29-35.
Marshall Fey, "Slot Machines" Nevada Publications, 1.sup.st Ed., (1983), pp. 212-215.
Marshall Fey, "Slot Machines" Nevada Publications, 2nd Ed., (1989), p. 215.
Marshall Fey, "Slot Machines" Nevada Publications, 3.sup.rd Ed., (1991), one page.
Plus Lotto, Web Site http://www.pluslotto.com, retreived on Feb. 28, 2000, Plus Lotto 1995-2000.
Stanford Wong, "Professional Video Poker 1.sup.st Ed." Pi Yee Press, La Jolla, CA (1988), Ed. p. 1 of chapter 1.
"Holt Electric Circuits, Digital & Analog," John Wiley & Sons, NY, (1978), pp. 253-255.
"IGT Player's Edge Poker Service & Parts Manual," (Part Number: 821-021-00 Rev. A), International Game Technology (IGT) (1986), pp. 4-11.
"Player's Edge Plus International Poker-Program Reference Guide," (Part Number: 821-038-00 Rev. A), International Game Technology (IGT) (1989, pp. 1-2, 1-3, 1-7, 3-1, 3-2, 3-8-3-11, 4-3, 4-4.
"Player's Edge Plus Video Poker Machine -Field Service Manual, " (Part Number: 821-029-00 Rev. A), International Game Technology (IGT) (1988), pp. 2-6, 2-9, 2-14, 3-3, 3-6, 5-21, 5-22, A14, A-18-A-22, D-6, E-14, F-9.
Bradley Davis, "Mastering Joker Wild Video Poker, " Applied Technology Press, Aurora, CO (1990), p. 13.
Dwight & Louise Crevelt, "Video Poker Manual" Gollehon Books, (1991), pp. 2, 3, 30-33, 36, 37, 22-25, 42-45.
InteractiveAgeDigital, Web Site http://www.commweek.com, retrieved on Feb. 28, 2000, CMPnet, CMP Media Inc., 2000.
Davis, Bradley, "Mastering Joker Wild Video Poker," Applied Technology Press, IGT1004213 - IGT1004216 (4 pages).
Document (photo) showing "Topsy Turvy," labeled as Apr. 1990, IGT1004747.
Document (photo) showing large slot machine, undated, IGT1005560.
Document showing "Topsy Turvy," undated, IGT1005139.
Fey, Marshall, The Complete Service Manual for Series E 1980 - 1986, Libert Belle Books, Front pages, Contents page, and one additional page, IGT1007394 - IGT1007396 (3 pages).
"Old Ideas Make New Ideas," Loose Change, Sep. 1996, pp. 22-24.
4-page document entitled "The Complete AWP Package from JPM," undated, IGT 059851-059854.
Article entitled "Pub models out of the woods . . . ," undated, IGT 058600.
Bill Kurtz, Slot Machines and Coin-Op Games (Quantum 1997), 5 pages.
Club Reno & Club Vegas, JPM Automated Machines, Ltd., 1991.
Coin Slot, Jan. 13, 1979, p. 21, IGT 58593.
Coin Slot, Jan. 24, 1986, p. 14, IGT 58601.
Coin Slot, Jan. 27, 1979, p. 32, IGT 58595.
Dieter Ladwig, Slot Machines (Phil Goddard trans., Chartwell 1992), 10 pages.
Document describing "Chase the Lady" game, document refers to date of Nov. 1988, IGT 159480.
Document describing "Chase the Lady" game, undated, IGT 059481.
Document describing "Fortune Wheel" game, undated, IGT 059870-059872.
Document describing "Money Wheel" game, document refers to date of Jan. 1979, IGT 59470, 59471.
Document describing "Seven Up" game, document refers to date of May 1987, IGT 59482, 59484.
Document describing "Wheel of Fortune" and "Wheel Deal" games, document refers to dates of Oct. 1981 and Jan. 1982, IGT 59466-59467.
Document showing "Break the Bank" game, undated, IGT 058609.
Document showing "Double Dice" game, undated, IGT 059506.
Document showing "Fortune Wheel" game, IGT 059834.
Document showing "Fortune Wheel" game, undated, IGT 059511.
Document showing "Fun Fair" game, undated, IGT 059508.
Document showing "Lucky Casino" game, undated, IGT 059499-059500.
Document showing "Reel Roulette" game, undated, IGT 059849.
Document showing "Space Fruits" game, undated, IGT 059509, IGT 058594.
Document showing "Spin Ball" game, undated, IGT 059504.
Document showing "Spun Gold" game, undated, IGT 059502.
Document showing "Take the Money" game, undated, IGT 058608.
Document showing "Top Strike" game, undated, IGT 058607.
Document showing "Zodiaco" game, undated IGT 059850.
Document showing Starstruck and "Carnival" games, undated, IGT 059497.
Document stating Oddballs—Various machines with 'discs' on them, IGT 59486 and additional page showing "Risk Disks" game, undated, IGT 59487.
Documents describing "Win Pot" game, undated, IGT 059867-059868.
Documents showing "Filthy Rich" game, undated, IGT 059859-059860.
Documents showing "Monopoly" and other games, Nov./Dec. 1992, IGT 059845-059846.
Documents showing "New Orleans" game, undated, IGT059487-059848.
Exhibit A, two unidentified pages of photographic images showing slot machines.
JPM Royal 50.
Jerry Ayliffe, American Premium Guide to Jukeboxes and Slot Machines (Krause 3d ed. 1991), 11 pages.
Pages from Coin Slot, handwritten date Jan. 26, 1990, IGT 059512-059513.
Portion of article from Coin Slot, dated Mar. 1990, which appears to show "Multi-Money" game (in left hand picture), IGT 059490, IGT 059491.
US Registered Trademark No. 1,987,499, registered on Jul. 16, 1996, Mark: Virtual Vegas.
Unidentified portion of article showing "Crazy Fruit" game, undated, IGT 059488.
Unidentified portion of article showing "Thesis Casino" game, undated, IGT 059472.
"Defendants' Notice of Removal of Civil Action to Federal Court Pursuant to 28 USC .sctn.sctn. 1331, 1338, 1441 et. seq.," Civil Action No. 99-698 and copy of complaint and complaint exhibits for Case No. 99-10125.
**John Gollehon, "All About Slots and Video Poker" Perigee Books, (1988), pp. 38-39, 42-43.
**Stanford Wong, "Professional Video Poker 1.sup.st Ed." Pj Yee Press, La Jolla, CA (1988); p. 1.
Amusement Machine Guide, Jul./Aug. 1988, cover pp. 3-233 and 235-242 and 2 additional pages (p. 234 is missing), Anchor 15796-16037.
Bally Bonus Sevy: Document showing 1993 Bonus Sevy game.
Bally Circus: Document describing 1972 "Circus" game, Anchor 15706.
Bally Circus: Document showing 1972 "Circus" game.
Bally Double or Nothing: p. 267 from "Chapter 11--1975-1984" describing 1975 Double or Nothing game, Model 1083.
Bally Fun Fair: Document showing "Fun Fair" game, Anchor 15596.
Bally Golden Wheels: Document showing 1973 Golden Wheels game.

Bally Lucky Stars: Cover page of journal entitled "Loose Change" dated Sep. 1991 and showing : Bally Lucky Stars game.
Bally Monte Carlo Slot Machine #1: Document with original color image of upper portion of 1977 Bally Monte Carlo slot machine #1 enclosed with Oct. 19, 2001 email.
Bally Monte Carlo Slot Machine #1: Oct. 19, 2001 email from Robert Kovelman to Joseph alkowski.
Bally Monte Carlo Slot Machine #2: Report entitled "Bally Manufacturing Corporation Monte Carlo Slot Machine Product Analysis Report," dated Jan. 28, 2004, pp. 1-36, with original color images, prepared by TAEUS describing 1976 Bally Monte Carlo slot machine #2.
Bally Monte Carlo: Oct. 18, 2001 letter from Robert Kovelman to Joseph Walkowski.
Bally Windsor Castle: Document showing Windsor Castle game, 1968, Anchor 15705.
Bally: Manual No. 2600 of Bally Manufacturing Corporation entitled "Bally Slot Machines—Service Instructions & Parts Catalog," dated Jan. 1, 1975, cover, table of contents and pp. 1-56.
Bally: Marshall Fey, Liberty Belle Books, "Ball Slot Machines—Electro-Mechanicals 1964-1980, Revised 3.sup.rd Edition, front cover (outside and inside), pp. 1-75, 2-p. chart entitled Bally Electro-Mechanical Slot Chart 1964-1980, 2-page chart entitled Bally Series E Slot Chart 1980-1987," additional page, and back cover (inside and outside).
Bally: Marshall Fey, Liberty Belle Books, "The Complete Service Manual for Bally Slot Machines—Electro-Mechanicals 1964-1980," dated 1993, front cover, table of contents page, pp. 2-111, and back cover.
Big 50 (Maygay): Document dated 1978 referring to "Big 50," Anchor 15709.
Bonus (Mills): Bueschel, Richard M., "Slots" p. 142, published in 1978.
Bueschel, Richard M., "Lemons, Cherries and Bell-Fruit Gum," published by Royal Bell Books, !Denver, Colorado, cover, p. iii, 23 and 31-48 describing "Wheels of Fortune" slot machines from 1895-1904.
Cash Drop (Gowerpoint): Coin Slot, Dec. 1979, p. 26, Anchor 15589.
Cashcade (BWB): Coin Slot, Feb. 8, 1985, p. 20, Anchor 15791.
Cashcade (BWB): Description of 1985 Cashcade game, Anchor 15790.
Casino Roulette (Maygay): EuroSlot, Oct. 1992, front page and additional page, ACRES 013923 and 013925.
Chase the Lady (BWB): Coin Slot, Nov. 4, 1988, p. 6, Anchor 15728.
Climax (Bell Fruit Manufacturing): Document showing 1982 Climax game, Anchor 15565.
Club Casino (Newby): 1990 document showing Club Casino game, Anchor 15576.
Club Monte Carlo (Bell-Fruit Manufacturing): Coin Slot, Jun. 22, 1984, p. 11, Anchor 15718.
Coin Slot International, No. 1208, Feb. 14, 1992, pp. 21, 32.
Complaint for Declaratory Judgment of Patent Noninfringement and Patent Invalidity dated Oct. 31, 2002 in Civil Action No. 02-1448.
Court document #176: "Plaintiffs' Motion for Leave to Supplement the Record regarding Plaintiffs' Motion for Summary Judgment on Defendant's Counterclaims for Correction of Inventorship".
Court document #178: "Transcript of Proceedings of Plaintiff's Motion on Defendant's Affirmative Defense of Inequitable Conduct and Plaintiff's Motion for Summary Judgment for Correction of Inventorship".
Court document #1: "Complaint for Patent Infringement, Breach of Covenant Not to Compete and Breach of Implied and Express Warranties".
Court document #38: "First Amended Answer and Counterclaims of Acres Gaming, Inc.".
Court document #62: "Acres' Opposition to Plaintiffs' Motion for a Preliminary Injunction".
Crusader (MDM Leisure): Coin Slot, Nov. 9, 1984, p. 6, Anchor 15586.
Declaration of John F. Acres dated Aug. 11, 1999 filed in Civil Action No. CV-S-99-00245 and marked Exhibit D, pp. 1, 3-6 and 19, describing 1992 Bally Bonus Sevy apparatus.
Dial (Mills): Bueschel, Richard M., "An Illustrated Guide to the 100 Most Collectible Trade Simulators," p. 83 (1978).
Eliminator (Maygay): Documents describing 1988 Eliminator game, 2 pages, Anchor 15653-15654.
Extra Line (JPM): EuroSlot, Sep. 1994, front page and additional page, ACRES 013907, 013909.
Fairest Wheel: Marshall Fey, "Slot Machines," p. 150 (1983).
Fortune Wheel (Project Coin): 2-page facsimile dated Aug. 23, 2000 from Richard Booth to Mike Broaddus regarding 1993 Fortune Wheel game, ACRES 14006-14007, 1-page "Sales Invoice No. 9312007" for Fortune Wheel game, ACRES 013988, 1-page "Acknowledgement of Order," ACRES 013989, and 1-page "Advice/Dispatch Note," ACRES 103990.
Fortune Wheel (Project Coin): Coin Slot, Apr. 10, 1992, 1 p., ACRES 13952.
Fortune Wheel (Project Coin): Coin Slot, Feb. 14, 1992, 1 page, ACRES 13949.
Fortune Wheel (Project Coin): Document entitled "Fortune Wheel—Instructions for Conversion" for 1993 Fortune Wheel game, ACRES 14008-14022.
Fortune Wheel (Project Coin): JPEG images of 1992 Fortune Wheel game enclosed with Jul. 27, 2000 letter, 6 pages, Mvc-109s, Mvc-110s, Mvc-116s, Mvc-120s, Mvc-121s, Mvc-160s.
Fortune Wheel (Project Coin): Jul. 27, 2000 letter from Michael Broaddus to Steven Daniels regarding 1992 Fortune Wheel game.
Futurity (Mills): Bueschel, Richard M., "Slots 1," p. 136, published in 1978.
Futurity (Mills): Geddes, Robert M., "Slot Machines on Parade," p. 128, published Oct. 1980.
Geddes, Robert N., "Slot Machines on Parade," First Edition, Mead Publishing Company, Oct. 1980, cover and p. ii, 1-18, 20, 22-28, 30-31, 39, 41-49, 132, 135, 142-143 and 146.
Golden Shot (Subelectro): Coin Slot, Jan. 25, 1985, p. 20, Anchor 15720.
Grand Royal (Jac van Ham): EuroSlot, Mar. 1994, front page and additional page, ACRES 013894 and 103897.
Lords and Jokers (Maygay): EuroSlot, Mar. 1994, front page and additional page, ACRES 013894 and 013896.
Lucky Dip (Maygay): Documents describing 1984 Lucky Dip game, 2 pages, Anchor 15554 and 15556.
Lucky Strike (Barcrest): Documents describing 1983 Lucky Strike game, 2 pages, Anchor 15655, 15656.
Money Wheel (Brenco): Coin Slot, Jan. 13, 1979, 1 page, Anchor 15731.
No. 1 (Bell-Fruit Manufacturing): Documents describing "No. 1" game, Nov. 1984, 3 pages, Anchor 15539, 15540, 15588.
Opposition of Australian Appl. No. 733599: "Statutory Declaration of Ante Milic," pp. 1-9, and Annexes AM-1 through AM-14.
Opposition of Australian Appl. No. 733599: "Statutory Declaration of Philip Clive Crouch," pp. 1-13 and Annex PCC-2.
Opposition of Australian Appl. No. 733599: "Statutory Declaration of Robert John Poynter," pp. 1-7, and Annexes RJB-1 through RJB-11.
Opposition of Australian Appl. No. 733599: 7-page document entitled "Statement of Grounds and Particulars Relating to Each Ground".
Opposition of Australian Appl. No. 733599: 8-page document entitled "The Claims Defining the Invention Are As Follows" (Australian claims 1-41).
Pages 1 and 118-121 of transcript of deposition of Mark Hettinger taken Nov. 3, 1999.
Pages 1-5, 62-125 and 278-281 of transcript of deposition of Steve Hyman taken Nov. 12, 1999 and Hyman Deposition Exhibits 6 and 22 (the exhibits are the best quality copies available).
Pages 41-44 of transcript of deposition of Michael Mitchell taken Oct. 22, 1999.
Pages 49-72 and 169-184 of transcript of deposition of William Adams taken Jun. 10, 1999 and Adams Deposition Exhibits 14-17 (the exhibits are the best quality copies available).
Photograph taken of Project Coin's Fortune Wheel Game.
Pik A Win (Maygay): Document showing "Pik A Win" game, handwritten date of Sep. 14, 1997, Anchor 15708.

Poundrush (JPM): Amusement Machine Guide, Jul./Aug. 1988, cover page and p. 15, 19, Anchor 15796, 15809, 15813.
Reflex (Bell-Fruit Manufacturing): Coin Slot, Jan. 25, 1985, p. 20, Anchor 15720.
Risk Disks (Bell-Fruit Manufacturing): Coin Slot, May 12, 1984, p. 24, Anchor 15558.
Roulette (BTR): EuroSlot, Mar. 1994, front page and additional page, ACRES 013894 and 013896.
Seven Up (Bell-Fruit Manufacturing): Coin Slot, May 8, 1987, pp. 40 and 41, Anchor 15732 and 15727.
Seven Up (Bell-Fruit Manufacturing): Document describing "Seven Up" game, documents refers to date of May 1987, Anchor 15553.
Seven Up (Bell-Fruit Manufacturing): Document showing 1987 "Seven Up" game, Anchor 15555.
Silver Gambler (Ace Coin): Coin Slot, Apr. 23, 1977, p. 15, Anchor 15593.
Silver Gambler (Ace Coin): Document describing "Silver Gambler" game, document refers to date of Jul. 1977, Anchor 15542.
Silver Machine (Ace Coin): Documents describing "Silver Machine" game, Nov. 1981, 3 pages, Anchor 15548, 15549, 15595.
Space Fruits (Omega): Coin Slot, Oct. 27, 1979, 1 page, Anchor 15730.
Spanish Official Bulletin of Industrial Property, 1986, p. 6610, Anchor 18077, with English translation of abstract 193.376.
Spanish Official Bulletin of Industrial Property, Apr. 1, 1988, pp. 1491-1492, Anchor 18070-18071, with English translation of abstract 1000994 and 1000995.
Spanish Official Bulletin of Industrial Property, Apr. 16, 1989, pp. 2610-2611, Anchor 18088-18089, with English translations of abstracts 1008483, 1008484.
Spanish Official Bulletin of Industrial Property, Feb. 16, 1994, p. 1089, Anchor 18085, with English translation of abstract 1025847.
Spanish Official Bulletin of Industrial Property, Mar. 1, 1989, pp. 1555-1556, Anchor 1806118062, with English translation of abstract 1007715.
Spanish Official Bulletin of Industrial Property, May 1, 1988, pp. 1977, Anchor 18069, with English translation of abstract 1001364.
Spin to Win (Associated Leisure): EuroSlot, Nov. 1993, front page snd additional page, ACRES 013887 and 103889.
Spin-A-Win (Bell-Fruit Manufacturing): Document dated Aug. 30, 1980 showing Spin-A-Win machine, Anchor 15587.
Super Roulette (Mitronics): Coin Slot, Jan. 24, 1986, p. 40, Anchor 15726.
Super Series (Barcrest): Documents describing 1981 Super Series game, 2 pages, Anchor 15657, 15658.
Super Shot (Associated Leisure): Coin Slot, Jan. 1985, Anchor 15719.
Super Star (Barcrest): Document showing Super Star game, Feb. 10, 1979, Anchor 15581.
Super Swap (Oper Coin): Coin Slot, Jan. 1990, 1 page, Anchor 15583.
Supplemental Declaration of John F. Acres dated May 6, 2000 filed in Civil Action No. CV-S-99-00245 and marked as Exhibit C, pp. 1-4, describing 1992 Bally Bonus Sevy apparatus.
Target (Aristocrat): Coin Slot, Jan. 26, 1980, p. 58 (bottom right), Anchor 15578.
Ten/Twenty (Ace Coin): Documents describing 1985 "Ten/Twenty" game, 3 pages, Anchor 15694, 15695, 15733.
Trispin (Oper Coin): Coin Slot, Jan. 1990, 1 page, Anchor 15583.
Twist 'n Shout (Project Coin): Documents describing "Twist 'n Shout" game, Oct. 16, 1992, 3 pages, Anchor 15643-15644 & ACRES 103956.
Victor (Drobush): Bueschel, Richard M., "An Illustrated Guide to the 100 Most Collectible Trade Simulators," p. 29 (1978).
Videomat: EuroSlot, Jan. 1993, front page and additional pages, ACRES 013926, 013928 and 013929.
Wheel 'n Deal (Summit Coin): Page from Coin Slot, Jan. 16, 1982 showing "Wheel 'n Deal" game and enlargement, 2 pages, Anchor 15592, 15538.
Wheel of Fortune (Barcrest): 2-page document referring to Wheel of Fortune I (1991) and Wheel of Fortune II (1995), Anchor 15774-15775.
Wheel of Fortune (Barcrest): Catalog of Barcrest Casino Technologies, 6 pages Anchor 15597-15599, 15602, 15617, 15619; page Anchor 15602, states "Price list per Jun. 1996", p. Anchor 15617 has 1995 date.
Wheel of Fortune (Barcrest): Document showing "Wheel of Fortune" game Anchor 15758.
Wheel of Fortune (Barcrest): EuroSlot, Aug. 1994, front page and additional page, ACRES 013904 and 013906.
Wheel of Fortune (Barcrest): Euroslot, Nov. 1995, front page and additional page, ACRES 013887 and 013890.
Wheel of Fortune (Barcrest): Intergame Magazine, Jun. 1995, cover.
Wheel of Fortune (Bell-Fruit Manufacturing): Page from Coin Slot, Jan. 26, 1980, showing "Wheel of Fortune" game (bottom left), Anchor 15578.
Wheel of Fortune (Griswold): Bueschel, Richard M., "An Illustrated Guide to the 100 Most Collectible Trade Simulators," p. 21 (1978).
Wheel of Fortune (Project Coin): Coin Slot, May 22, 1992, 2 pages, ACRES 013940 and 013946.
Wheel of Fortune (Project Coin): Coin Slot, May 29, 1992, 1 page, ACRES 013936.
Wheel of Fortune (Project Coin): EuroSlot, Apr. 1994, front page and additional page, ACRES 013898 and 013900.
Wheel of Fortune (Project Coin): JPEG images of 1992 Wheel of Fortune game enclosed with Jul. 13, 2000 letter, 6 pages, Mvc-134s, Mvc-135s, Mvc-136s, Mvc-137s, Mvc-143s, Mvc-161s.
Wheel of Fortune (Project Coin): Jul. 13, 2000 letter from Michael Broaddus to Steven Daniels regarding 1992 Wheel of Fortune game.
Wheel of Fortune (Summit Coin): Page from Coin Slot, Jan. 16, 1982 showing "Wheel of Fortune" game and enlargement thereof, 2 pages, Anchor 15592, 15538.
Wheel of Fortune: Coin Slot, Oct. 18, 1985, p. 12, Anchor 15722.
Wheel of Fortune: EuroSlot, May 1992, front page and additional, ACRES 013913 and 013915.
Whirlo: Coin Slot, Feb. 14, 1986, p. 28, Anchor 15725.
Winspin (Associated Leisure): Coin Slot article referring to 1985 Winspin game, Anchor 15721.
Winspin (Associated Leisure): Document entitled "Coin Slot Archive Summary" referring to Apr. 26, 1985 article regarding Winspin, Anchor 15735.
Fey, Marshall Slot Machines—A Pictorial History of the First 100 Years',Fourth Edition.published by Liberty Bell Books, 1994, cover and pp. 1, 6, 17, 19, 20, 30, 32, 34, 68, 70-73, 77-79, 86-88, 90, 92-93, 96, 98-99, 128, 150, 154, 158-159, 230, 232-234 and 237.
Defendant IGT's First Amended Answer to Plaintiff Bally's Complaint for Patent Infringement.
Document showing "Windsor Castle," undated, AGC00119798.
Case 3:06-cv-00483-ECR-RAM Document 127, Declaration of *Carl* V. *Kniesteadt*, 6 pages , Filed Dec. 31, 2007, Dated Dec. 17, 2007.
Case 3:06-cv-00483-ECR-RAM Document 127-2, Exhibit 1 of Kniesteadt Declaration, SS/ER Request Form, Circus Circus Reno, Ken Swanson, IGT004738, 2 pages , Filed Dec. 31, 2007, Dated Dec. 4, 1989.
Case 3:06-cv-00483-ECR-RAM Document 127-3, Exhibit 2 of Kniesteadt Declaration, IGT005568-IGT005569, 3 pages , Filed Dec. 31, 2007, Photograph of SMB $5.00 Slot Machine, Dated Dec. 1, 1987.
Case 3:06-cv-00483-ECR-RAM Document 127-4, Exhibit 3 of Kniesteadt Declaration, SS/ER Request Form, Circus Circus Reno, Ken Swanson, IGT004739, 2 pages , Filed Dec. 31, 2007, Dated Dec. 5, 1989.
Case 3:06-cv-00483-ECR-RAM Document 127-5, Exhibit 4 of Kniesteadt Declaration, SS/ER Request Form, Circus Circus Reno, Ken Swanson, IGT004740, 2 pages , Filed Dec. 31, 2007, Dated Jan. 19, 1990.
Case 3:06-cv-00483-ECR-RAM Document 127-6, Exhibit 5 of Kniesteadt Declaration, IGT Slot Line, IGT004768-IGT004771, 5 pages, Filed Dec. 31, 2007, Dated Jul./Aug. 1990.
Case 3:06-cv-00483-ECR-RAM Document 127-7, Exhibit 6 of Kniesteadt Declaration, Photograph of Topsy Turvy Machine, IGT004746, 2 pages , Filed Dec. 31, 2007, undated.
Case 3:06-cv-00483-ECR-RAM Document 128, Declaration of Paul T. Milare, 4 pages , Filed Dec. 31, 2007, Dated Dec. 4, 1989.

Case 3:06-cv-00483-ECR-RAM Document 128-2, Exhibit 1 of Millare Declaration, Photograph of Topsy Turvy Machine with 3 unidentified men, 2 pages, Filed Dec. 31, 2007, Dated Dec. 4, 1989.
Case 3:06-cv-00483-ECR-RAM Document 128-3, Exhibit 2 of Millare Declaration, Mechanical Breakout Drawing of Reel Assembly, PROGRESSIVE000167, 2 pages , Filed Dec. 31, 2007, undated.
Case 3:06-cv-00483-ECR-RAM Document 128-4, Exhibit 3 of Millare Declaration, Photographs of Filing Cabinets for Colossus, Topsy Turvy, etc., PROGRESSIVE000392-PROGRESSIVE000394, 4 pages , Filed Dec. 31, 2007, undated.
Case 3:06-cv-00483-ECR-RAM Document 128-5, Exhibit 4 of Millare Declaration,Mechanical Drawings of Freeplay Circus, Progressive 151, 158,161,163,166, 6 pages , Filed Dec. 31, 2007, dated Aug. 26, 1991.
Case 3:06-cv-00483-ECR-RAM Document 129, Declaration of Peter Walker, 3 pages , Filed Dec. 31, 2007, Dated Sep. 7, 2007.
Case 3:06-cv-00483-ECR-RAM Document 129-2, Exhibit 1 of Walker Declaration, IGT005568- IGT005569, 3 pages , Filed Dec. 31, 2007, Photograph of SMB $5.00 Slot Machine, Dated Dec. 1, 1987.
Case 3:06-cv-00483-ECR-RAM Document 129-3, Exhibit 2 of Walker Declaration, IGT Slot Line, IGT004768-IGT004771, 5 pages , Filed Dec. 31, 2007, Dated Jul./Aug. 1990.
Case 3:06-cv-00483-ECR-RAM Document 129-4, Exhibit 3 of Walker Declaration, Photograph of Topsy Turvy Machine with one unidentified man and two unidentified women, A1826, 2 pages, Filed Dec. 31, 2007, undated.
Case 3:06-cv-00483-ECR-RAM Document 129-5, Exhibit 4 of Walker Declaration, Photograph of Topsy Turvy Machine, IGT004746, 2 pages , Filed Dec. 31, 2007, undated.
Case 3:06-cv-00483-ECR-RAM Document 129-6, Exhibit 5 of Walker Declaration, ID#32B081, Photograph of Topsy Turvey Machine, Circus Circus Shot in Warehouse, IGT Photography Studio, IGT004747, 2 pages, Filed Dec. 31, 2007, dated Apr. 1990.
Case 3:06-cv-00483-ECR-RAM Document 124, IGTiS Ammended Motion for Summary Judgement that the ë916 Patent is Invalid Based on the Prior Art iTopsy Turvyî Machine, 36 pages, Filed Dec. 31, 2007, dated Apr. 1990.
Bally Monte Carlo ad copy with Photograph of Monte Carlo Slot Machine, AGC00119786, undated.
Bally Monte Carlo Danish ad copy with Photograph of Monte Carlo Slot Machine, AGC00119787, undated.
Bally-Who International Bally Newsletter, vol. 3, No. 4, AGC00119738- AGC00119743, 6 pages, dated Aug. 1978.
Case 3:06-cv-00483-ECR-RAM Document 126, Bittman Declaration, Filed Dec. 31, 2007, Dated Sept. 14, 2007.
Case 3:06-cv-00483-ECR-RAM Document 126-2, Exhibit 1 of Bittman Declaration, IGT Slot Line, IGT004768-IGT004771, 5 pages , Filed Dec. 31, 2007, Dated Jul./Aug. 1990.
Case 3:06-cv-00483-ECR-RAM Document 126-3, Exhibit 2 of Bittman Declaration, General Information Current Status, IGT1010305-IGT1010313, 10 pages , Filed Dec. 31, 2007, date illegible.
Case 3:06-cv-00483-ECR-RAM Document 126-4, Exhibit 3 of Bittman Declaration, International Game Technology Sales Order Inquiry, IGT1004773-IGT1004800, 29 pages , Filed Dec. 31, 2007, date illegible.
Case 3:06-cv-00483-ECR-RAM Document 125, Declaration of Lindsay D. Casamassima in Support of IGTis amended Motion for Summary Judgement that the ë916 Patent is Invalid Based on the Prior Art iTopsy Turvy Machine, 4 pages, dated Sep. 15, 2005.
Case 3:06-cv-00483-ECR-RAM Document 125-2, Exhibit A of Casamassima Declaration, U.S. Patent 7,100,916, Kelly et al., 25 pages , dated Sep. 5, 2006.
Case 3:06-cv-00483-ECR-RAM Document 125-3, Exhibit B of Casamassima Declaration, Patent Application, 956057, Kelly et al., BALLY000031-BALLY000056, 27 pages , dated Oct. 2, 1992.
Case 3:06-cv-00483-ECR-RAM Document 125-4, Exhibit C of Casamassima Declaration, IGTis Supplimental Disclosures Pursuant to Paragraph 3(b) of the Joint Discovery Plan and Scheduling Order, 35 pages , filed Dec. 31, 2007.
Case 3:06-cv-00483-ECR-RAM Document 125-5, Exhibit D of Casamassima Declaration, Colossus Status as of Jul. 10, 1992, 2 pages, dated Jul. 10, 1992.
Case 3:06-cv-00483-ECR-RAM Document 125-6, Exhibit E of Casamassima Declaration, Topsy Turvy ad copy,IGT005139-IGT005140, 3 pages, filed Dec. 31, 2007, undated.
Case 3:06-cv-00483-ECR-RAM Document 125-7, Exhibit F of Casamassima Declaration, Topsy Turvy Circus Free Play Project No. M200100, IGT005141-IGT005151, 12 pages, filed Dec. 31, 2007, undated.
Case 3:06-cv-00483-ECR-RAM Document 125-8, Inquiry, Record ID Code, IGT004748, 12 pages, filed Dec. 31, 2007, undated.
Case 3:06-cv-00483-ECR-RAM Document 125-9, Exhibit H of Casamassima Declaration, Photograph of Topsy Turvy Machine with 3 unidentified men, IGT005558, 2 pages , Filed Dec. 31, 2007, undated.
Case 3:06-cv-00483-ECR-RAM Document 125-10, Exhibit I Part 1 of Casamassima Declaration, U.S. Patent Office Communication pertaining to U.S. Appl. No. 10/637,185, Raleigh Chiu, BALLY001975- BALLY002050, 39 pages , dated Feb. 25, 2005.
Case 3:06-cv-00483-ECR-RAM Document 125-11, Exhibit I Part 2 of Casamassima Declaration, U.S. Patent Office Communication pertaining to U.S. Appl. No. 10/637,185, Raleigh Chiu, BALLY002057- BALLY002119, 28 pages , dated Sep. 15, 2005.
Case 3:06-cv-00483-ECR-RAM Document 125-12, Exhibit J of Casamassima Declaration,Videotaped Deposition of Peter Walker, 22 pages , dated Nov. 30, 2007.
Case 2:04-cv-01676-RCJ-RJJ Document 425, filed May 9, 2007, U.S. District Court of Nevada, Order, Claim Construction, for ë646, ë932, 1573, ë891,i698, and i985 patents, 83 pages, dated May 9, 2007.
Case 2:04-cv-01676-RCJ-RJJ Document 948, filed May 9, 2007, U.S. District Court of Nevada, Order, Ruling on Motions for Summary Judgement, 74 pages, dated Oct. 16, 2008.
Case 3:06-cv-00483-ECR-RAM Document 122, Order, 28 pages, Filed Dec. 11, 2007, dated Dec. 11, 2007.
List of Machines Sheet 20, one page, AGC00124609, undated.
Mead Publishing Company, Bally Slot Machines Listing, p. 4, one page, AGC00124577, undated.
1975 Model 1083 “Double or Nothing”, Go for Broke, p. 45, one page, AGC00002526, undated.
Profit-Proved Bally Play Feature, Double or Nothing, Model 1083, p. 66, one page, AGC00119685.
Trademark Application Fee Record Sheet, Serial No. 73321, IGT1004644, PTO-1555, May 1987.
Case 3:06-cv-00483-ECR-RAM Document 124,IGT’S Ammended Motion for Summary Judgement, 36 pages, Filed Dec. 31, 2007, dated Dec. 31, 2007.
Document showing Vegas and Club Reno, IGT1004364, 3 pp., Anchor 15655, undated.
Cabaret 100, Anchor 15650, one page, undated.
Bally Royal Castle, Model #901, p. 17, AGC00119687, undated.
Deposition Transcript of Richard D. Meitzler, Cv-S-04-1676-RCJ-RJJ, cover sheet and pp. 2932, 37-39, 53-62, dated Aug. 2, 2007.
Faxed Declaration of Richard Meitzler, Cv-S-04-1676-RCJ-RJJ, AGC00161768-AGC00161776, dated Apr. 23, 2007.
Declaration of Greg Malinowski, CV-S-04-1676-RCJ-RJJ, 3 pages, dated Dec. 5, 2007X53 X54 Declaration of Shivji Kerai, CV-S-04-1676-RCJ-RJJ, AGC00125167-AGC00125178, dated Dec. 13, 2007.
USPTO Trademark Principal Register, Wheel of Gold, Reg. No. 2,226,443, IGT279505- 1GT279517, dated Feb. 23, 1999.
Image showing 2p, 5p, 10p, 20p Switchable, one page, undated.
Image showing 2p, 5p, 10p, 20p Switchable, New Fortune Wheel Conversion Kit, ACRES013958, IGT037610, one page, dated Oct. 29, 1993.
Coin Slot, Oct. 29, 1993, p. 21, AGC00164050-AGC00164073.
Spanish Trademark Document for Cirsa Fortuna, dated Jan. 25, 1988, AGC00161033-AGC00161034, AGC00161040-AGC00161041.
Azar La Feria De Barcelona, Spanish publication, dated Nov. 1988, AGC00141512-AGC00141541.
Cirsa Fortuna, Breaking the Standards, undated, AGC00157628-AGC00157632.

Letter from Ken Bradley, Vidco, to Olgica Lenger, Liquor Administration Board, RE Application of Approval of Additional Variations for Game Combination, dated Aug. 14, 1995, AGC00002153-AGC00002172.
Declaration of Carlos Garcia Morales, CV-S-04-1676-RCJ-RJJ, dated Dec. 4, 2007.
Deposition of Richard Booth, CV-S-04-1676-RCJ-RJJ, pp. 1-70 dated Oct. 13, 2008.
Order, Case 3:06-cv-00483-ECR-RAM Document 332, pp. 1-19, Sep. 9, 2008.
Declaration of Carlos Garcia Morales, CV-S-04-1676-RCJ-RJJ, dated Jun. 11, 2007, AGC00161059-AGC00161063.
Court of Appeals Federal Circuit, Non-Confidential Initial Brief, Case 3:06-cv-00483-ECR-RAM, dated Feb. 20, 2009.
Deposition of Ramon de Beneducci, CV-S-04-0703-ECR-RAM, dated Jul. 27, 2007.
Declaration of Richard Booth, CV-S-04-1676-RCJ-RJJ, AGC00164074-AGC00164079, dated Dec. 28, 2007.
Deposition of Anthony Boulton, CV-S-04-0703-ECR-RAM, dated May 9, 2006.
Mead Publishing Company, Bally Slot Machines Listing, AGC00124573-AGC00124620, date illegible.
Coin Slot, Jul. 17, 1992, p. 25, AGC00024191.
Bally Slot Machines, an Illustrated Guide to the 285 Most Popular Electro-Mechanical and Series E Models, AGC00002482-AGC00002561, undated.
Statutory Instrument 1992 No. 2647, 4 pages, dated Sep. 20, 2000.
Exhibit A. Photographs of "Skilled Slot Machine Games" and "Arcade Skill Stop Games". Spring, 1991.
Demand for Jury Trial (US Dist. Ct. Case No. 3:06-CV-00483-ECR-(RAM) (12 pages).
Document (photo) showing "Cyclone," undated (3 pages).
Document (photo) showing "Harrah's" large slot machine, undated, IGT1005572.
Document (photo) showing "Mad Money" large slot machine, undated, IGT1005570.
Document (photo) showing slot machine labeled SMB $5.00, undated, IGT1005568.
Documents (photos and negatives) showing large slot machine, undated, IGT1005576-77, 79-83'.
EuroSlot, Jun. 1992, front page, contents page, 3 additional pages.
EuroSlot, Mar. 1992, front page, contents page, p. 48.
EuroSlot, Sep. 1992, front page, contents page, additional page.
Jokers Wild (JPM): EuroSlot, Jun. 1992, front page and 3 additional pages.
Opposition of Australian Appl. No. 58011/01: Claims being opposed. (BB6).
Topsy Turvy (IGT): Front page of IGT Slot Line magazine, Jul./Aug. 1990, and enlarged image of Topsy Turvy machine.
**"Player's Edge Plus Domestic Video Poker--Progam Reference Guide," (Part no. 821-039-00 Rev. A), International Game Technology (IGT) (1989), Sections 3-1, 3-2, 3-8, 3-11, 3-13.
**"Player's Edge Plus Servies—Field Service Manual," (Part no. 821-037-00 Rev. A), International Game Technology (IGT) (1989), Sections 1-1, 1-2, 2-3, 2-10, 2-12, 2-13, 5-23, 5-25, C-12, D-16.
**John Scame, "Scame's Encylopedia of Games,"Harper & Row, New York, NY (1973), pp. ix-xii, 47-48.
**John Scame, "Scame's Guide to Modern Poker," Simon & Schuster, New York, NY (1980), pp. 29-34, 29-35.
**Marshall Fey, "Slot Machines" Nevada 215. Publications, l.sup.st Ed., (1983), pp. 208, 212, 214, 215.
**Marshall Fey, "Slot Machines" Nevada Publications, 2.sup.nd Ed., (1984), pp. 213, 215.
**Marshall Fey, "Slot Machines" Nevada Publications, 3.sup.rd Ed., (1991), p. 215.
**Plus Lott, Web Site http://www.pluslotto.com, retrieved on Feb. 28, 2000, Plus Lotto 1995-2000.
Air Link (Omega): Document dated Aug. 30, 1980 showing Air Link machine, Anchor 15587.
Bally Monte Carlo Slot Machine #1: Oct. 23, 2001 email from Robert Kovelman to Joseph Walkowski regarding 1977 Bally Monte Carlo Slot machine #1, 2 pages.
Bally Monte Carlo: 1-page advertisement enclosed with Oct. 18, 2001 letter showing Bally Monte Carlo game, dated 1978.
Bally Monte Carlo: 1-page document enclosed with Oct. 18, 2001 letter listing model numbers, names and release dates for various Bally games, including Model No. 1117 for Danish Monte Carlo released Jan. 5, 1977 and Model No. 1117-1 for Australian Monte Carlo released Jan. 18, 1977.
Bally Monte Carlo: 1-page document enclosed with Oct. 18, 2001 letter showing image of three 2001 Bally Monte Carlo slot machines.
Bally Monte Carlo: 1-page sheet enclosed with Oct. 18, 2001 letter showing and describing 1977 Bally Monte Carlo game.
Bally Monte Carlo: Document with photocopied image of entire 1977 Bally Monte Carlo slot machine #1 enclosed with Oct. 18, 2001 letter.
Bally Monte Carlo: Document with photocopied image of upper portion of 1977 Bally Monte Carlo slot machine #1 enclosed with Oct. 18, 2001 letter.
Cabaret (Barcrest): Documents describing 1982 Cabaret game, 2 pages, Anchor 15649-15650.
EuroSlot, Jun. 1992, front page, contents page, 2 add'l pages.
Page 253 of transcript of deposition of John F. Acres on Nov. 11, 1999 describing 1992 Bally Bonus Sevy apparatus.
Wheel of Fortune (Barcest): 15-page document describing "Wheel of Fortune" game, dated Dec. 16, 1991, Anchor 15759-15773.

* cited by examiner

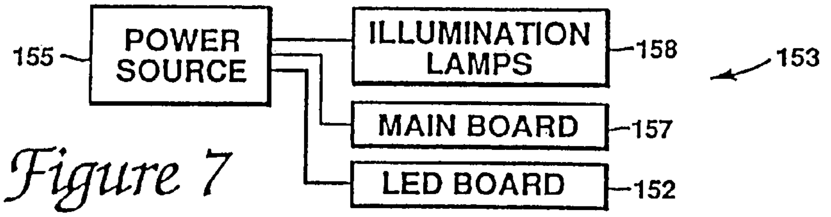
Figure 7
Figure 8
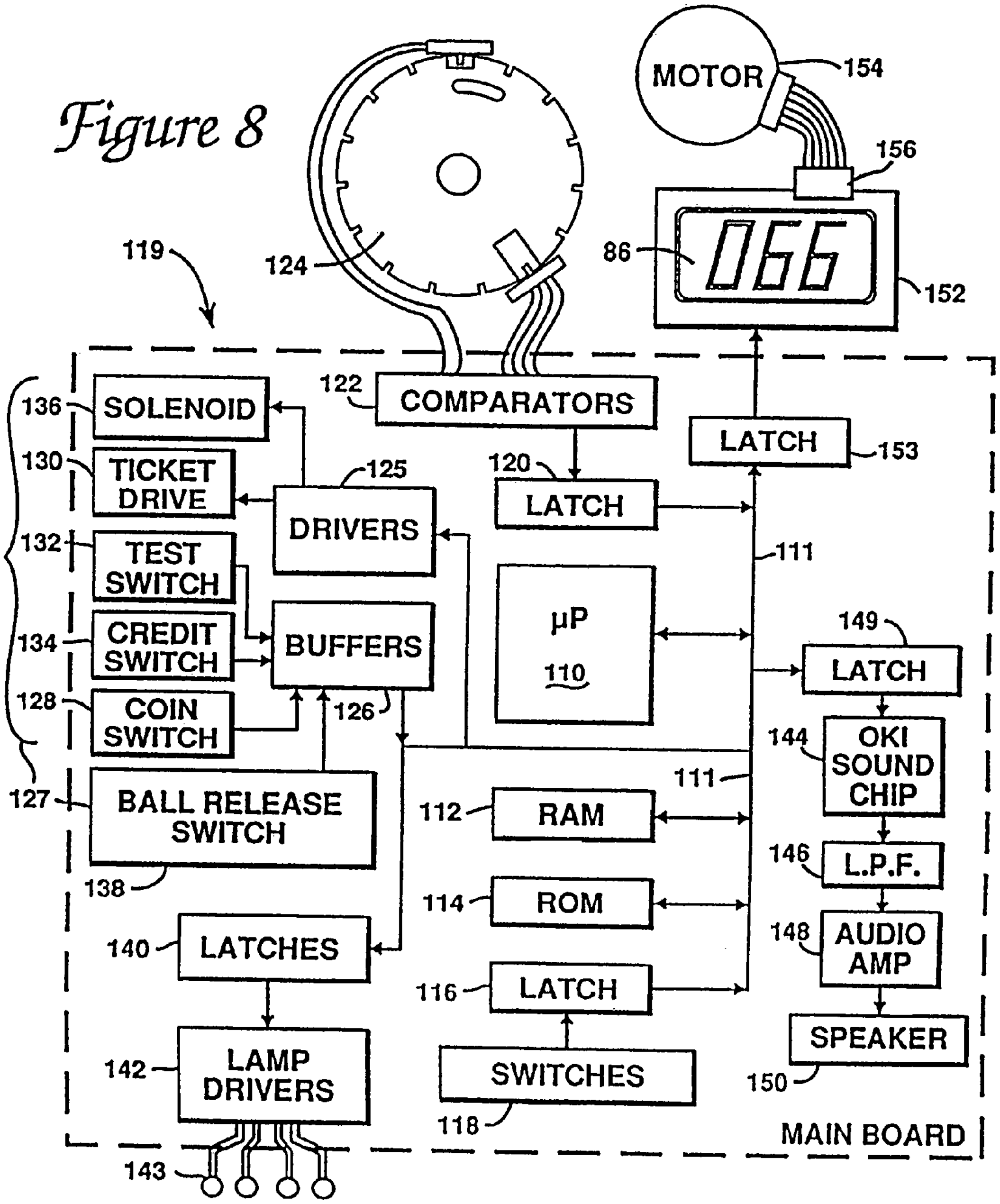

170

84
154
162
166
164
R
161
124
160
165
163
167

ARCADE GAME

CROSS-REFERENCE TO RELATED APPLICATIONS

This application claims priority to and the benefit of patent application Ser. No. 10/176,100, filed on Jun. 19, 2002, entitled "ARCADE GAME WITH SPINNING WHEEL BONUS," by Kelly et al, which is a continuation of application Ser. No. 09/695,712, filed on Oct. 23, 2000, now issued as U.S. Pat. No. 6,446,964, which is a continuation of application Ser. No. 09/351,408, filed on Jul. 9, 1999, now U.S. Pat. No. 6,244,595 which is a continuation of application Ser. No. 08/995,649, filed on Dec. 22, 1997, now U.S. Pat. No. 5,967,514, which is a continuation of application Ser. No. 08/428,524, filed on Apr. 21, 1995, now U.S. Pat. No. 5,700,007, which is a continuation of application Ser. No. 08/176,862, filed on Jan. 3, 1994, now U.S. Pat. No. 5,409,225, which is a continuation of application Ser. No. 07/956,057, filed on Oct. 2, 1992, now U.S. Pat. No. 5,292,127 all applications being incorporated herein by reference.

BACKGROUND OF THE INVENTION

1. Field of the Invention

This invention relates to games normally played in an arcade environment, and more particularly to such games played by directing a playing piece towards a target and seeing the results of game play displayed on a rotatable wheel.

2. Background of the Related Art

Roll-down games have been played for many years in arcade environments. These games usually include a ramp and one or more targets at the end of the ramp. A player rolls a ball down the ramp towards a desired target, and a game score is displayed on a scoring display based upon the player's success.

In U.S. Pat. No. 810,299, O. E. Pettee describes a game in which a ball is rolled down a plane towards an upright target pin. When the pin is impacted, a motor activates to spin a dial. When the dial stops spinning, it indicates the player's score.

In U.S. Pat. No. 2,141,580, S. E. White describes a game in which a ball is tossed into holes marked in various time intervals. A spinning dial hand is stopped from rotating by the amount of time indicated by the hole that the ball is tossed into. The object of the game is to make the dial stop at a chosen character or numeral on the dial face.

In U.S. Pat. No. 2,926,915, F. D. Johns describes a skee-ball game in which a ball is rolled towards a scoring drum and in which tickets are dispensed to the player by an electrically operated automatic ticket dispenser.

Roll-down games of the prior art, while enjoyable, are rather simple games and, as such, often lead to rapid player boredom. This is undesirable in an arcade environment where revenues are directly related to the continuous, repeated use of the games.

BRIEF DESCRIPTION OF THE DRAWINGS

FIG. 7 is a block diagram of the control system for an individual game unit;

FIG. 8 is a block diagram of the electronic components used in an individual game unit.

DETAILED DESCRIPTION OF THE PREFERRED EMBODIMENTS

Figure 1:
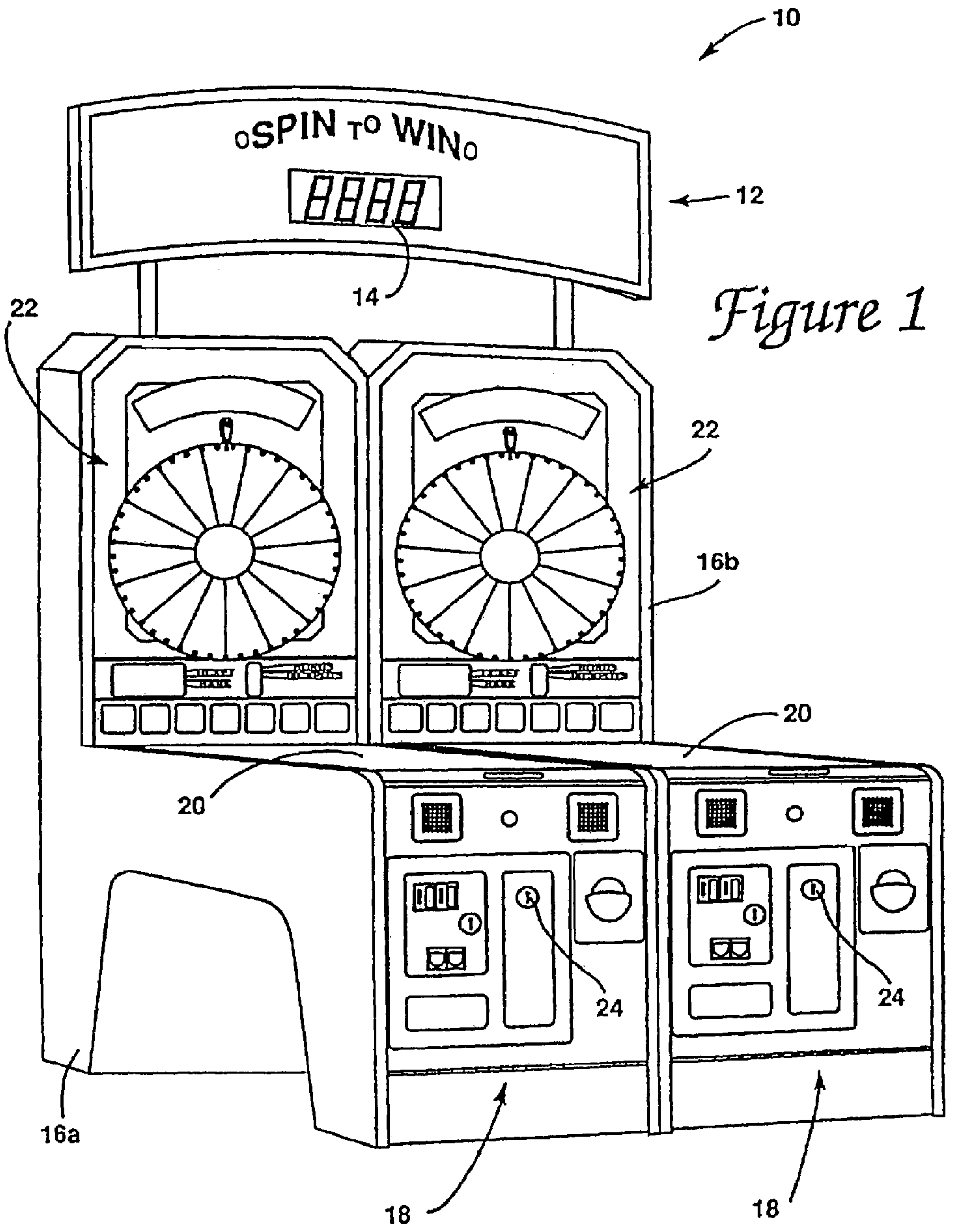
FIG. 1 is a perspective view of two individual game units connected to a progressive score display.

In FIG. 1, a multi-station game apparatus 10 in accordance with the present invention includes a progressive bonus apparatus 12 with progressive score display 14 coupled to a first individual game unit 16*a* and a second individual game unit 16*b*. Further individual game units 16 may be coupled to the progressive game apparatus 10 as desired.

Each individual game unit 16 has the ability to be played on its own, independent of the other game units 16 coupled to progressive bonus apparatus 12. Each individual game unit 16 includes a front panel 18 and a display area 22. A goal for each game unit 16 should be accomplished in a skillful manner, for instance, a ball can be guided into an aperture using hand-eye coordination, or a disc or ball could be skillfully aimed into a target using electrical controls.

An individual game unit 16 further has the ability to dispense a non-monetary award to a player. Such an award might be tickets redeemable for prizes. The award also could be baseball cards or other similar non-monetary prizes. In the preferred embodiment, each individual game unit 16 dispenses one or more tickets to the player from the front panel 18 through an award dispensing slot 24. Ticket dispensing mechanisms are well-known in the prior art.

According to certain embodiments, several game machines or game units are networked to an award server (progressive bonus apparatus). A player at any of the machines can play a game of skill. Such games require sufficient skill so that the games are not primarily games of chance. Each game machine is in digital communication with the award server. Such digital communication includes game information and award information.

According to certain embodiments, the network of game machines and award server uses a serial transmission protocol. According to some embodiments, such a serial transmission protocol is an RS-232 protocol.

According to certain embodiments, the award server provides awards based on one or more criteria including a game result, a progressive score, a completion of a specific task, an attainment of a specific goal and the number of players. The progressive score is associated with a progressive bonus. Such a progressive bonus is based on contributions from the various game machines. The progressive score may be incremented or decremented based on the contributions from the game machines.

Figure 2:
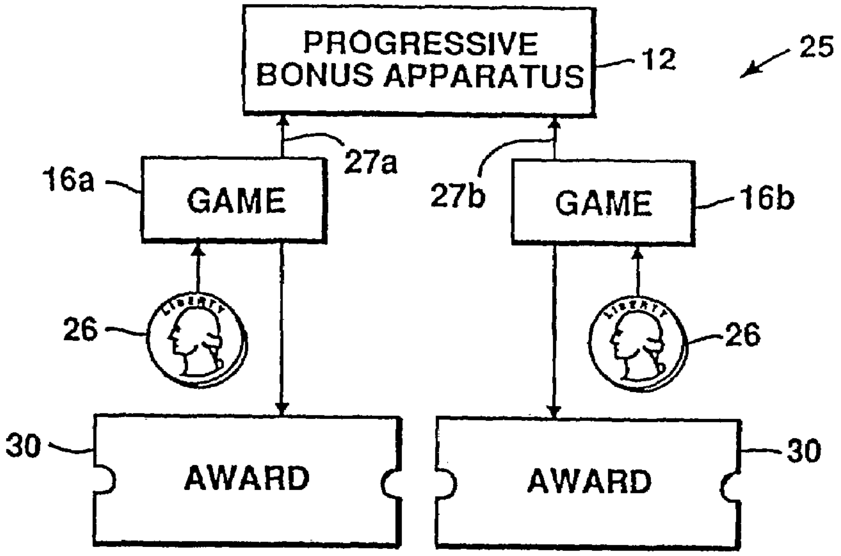
FIG. 2 is a flow chart of the progressive enhanced award process.

The process that the multi-station game apparatus 10 uses to receive money and dispense non-monetary awards is illustrated in the block diagram 25 of FIG. 2. A player inserts monetary input 26 into an individual game unit 16*a* or 16*b*. Typically, this monetary input 26 is one or more coins, or it may be tokens that are standard in an arcade environment. Each game unit 16*a* and 16*b* is connected to the progressive bonus apparatus 12 by a data bus 27*a* and 27*b*, respectively.

The progressive bonus apparatus 12 has an output on a progressive score display 14 (see FIG. 1) which begins at a predetermined starting value. For example, the progressive score might be set at a starting score of zero. Or, so that a bonus award might be immediately available to players, the starting score could be set at a higher value.

The progressive score displayed by the progressive bonus apparatus 12 is accumulated from contributions by the individual game units 16 over the data busses 27*a* and 27*b*. The contributions can be determined in a variety of ways. In the preferred embodiment, each game unit 16 sends a signal to the progressive bonus apparatus 12 whenever a player deposits a coin or coins into the game unit 16. When the progressive bonus apparatus 12 receives this signal, it increments the progressive score by one, one-half, or another predetermined value. Thus, each game unit 16 that is played will increment the progressive score by this value. Other methods might be used where the game unit 16 sends its increment signal when a player reached a predetermined score. Also, the progressive bonus apparatus 12 could be set to multiply the progressive score by a selected quantity whenever a game unit 16 sends an increment signal.

Each individual game unit 16 has one or more predetermined tasks for the player to accomplish in order for the player to receive a bonus award 30 based on the progressive score displayed by the progressive bonus apparatus 12. All game units 16 that are attached to a single progressive bonus apparatus 12 should require the same predetermined task, so that each player competing for the progressive score has a task of the same duration and level of difficulty. This predetermined task has several possible variations. One variation might be that the player has to achieve a specific game score on his individual game unit 16 in order to win the progressive score. A different variation might be that the player must finish two or more games in a row by accomplishing a specific game result, such as hitting a "jackpot" on the game display 22.

The first player to accomplish the predetermined task is entitled to the non-monetary bonus award 30 based upon the progressive score displayed on the progressive bonus apparatus 12. In the preferred embodiment, this bonus award 30 is manually given to the winning player by the owner or operator of the multi-station game apparatus 10. The bonus award 30 can be a number of normal game unit 16 awards: tickets, cards, or whatever the non-monetary award might be. Such a bonus award 30 might also be dispensed to a player as follows: the progressive bonus apparatus 12 sends the progressive score data over a data bus to the winning game unit 16. The winning game unit 16 then dispenses the bonus award 30 to the player by that game unit's 16 normal award-dispensing means 24. In any case, once the player has won the bonus award 30, his individual game unit 16 is reset and the progressive bonus apparatus 12 is reset.

Figure 3:
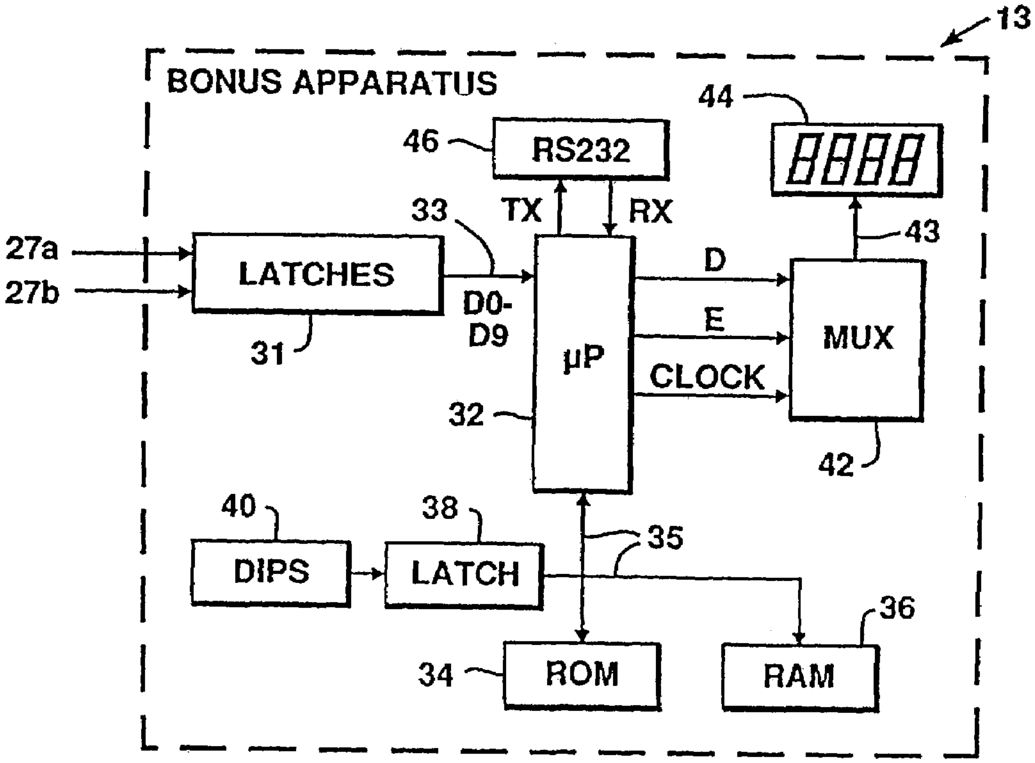
FIG. 3 is a block diagram of the microprocessor and display electronics used in the progressive bonus apparatus.

FIG. 3 is a block diagram of a control system 13 for the progressive bonus apparatus 12. The control system 13 includes a microprocessor 32, data bus 33, read-only memory (ROM) 34, random-access memory (RAM) 36, a latch 38, DIP switches 40, a multiplexer 42, an LED display 44, and an RS-232 port 46.

The microprocessor 32 is preferably an Intel 8031 8-bit microprocessor, which has the range of features adequate for the task, including eight data lines and sixteen address lines. The microprocessor 32 receives data inputs D0-D9 inputs on data bus 33 from individual game units that are connected to the progressive bonus apparatus 12, one data line is required per game unit, so a maximum of ten individual games may be connected to the progressive bonus apparatus in this embodiment. Data latches 31 are used to couple the data busses from each unit (such as data busses 27*a* and 27*b*) to the data bus 33.

The microprocessor 32 is coupled to ROM 34 by an address/control/data bus 35. The ROM 34 is preferably an erasable programmable read-only memory (EPROM) that contains the start-up instructions and operating system for the progressive bonus apparatus. Microprocessor 32 is connected to RAM 36 by the bus 35 to permit the use of RAM as scratch-pad memory.

The microprocessor 32 is also coupled to a latch 38 and DIP switches 40 by bus 35. The DIP switches 40 provide selectable functions that the owner or operator of the multi-unit game apparatus 10 may change to his or her liking. These selectable functions include setting the base payout score that the progressive bonus apparatus 12 will display in its starting state, and the increment value that the apparatus will use to increase the progressive score whenever a player achieves the predetermined task. Other selectable functions could also be set by the DIP switches depending on how many selectable game options and features are desired.

The microprocessor 32 is also coupled to a multiplexer 42. The multiplexer 42 receives a clock signal, an enable signal, and a serial LED data signal from the microprocessor 32. The multiplexer then outputs control signals to the segments of the LED display 44 on a bus 43.

The progressive bonus apparatus can also optionally send and receive message signals through a standard RS-232 interface 46. The RS-232 interface allows the control system 13 to be coupled to a computer system or other data processing system to allow the control and analysis of the control system 13.

The control system 13 for the progressive bonus apparatus 12 operates as follows.

The microprocessor 32 first reads the low memory from ROM 34 over bus 35 and then sequences through the software instructions stored in ROM. The software from the ROM 34 instructs the microprocessor 32 to read the DIP switches 40, read in the game unit signals on busses 27*a* and 27*b* from the latches 31, and display or update the score LED display 44 with the information from the game unit signals. If a game unit signal on busses 27*a* or 27*b* indicates a game is over, the microprocessor 32 modifies the progressive score by the determined amount. When a game unit signal on busses 27*a* or 27*b* indicates that a game unit 16 has won the progressive bonus award, the microprocessor 32 sends signals to flash the score display and activate lights and sound speakers (not shown) indicating the bonus has been won. The owner or operator of the game units 16 may then present the bonus award to the player who won it. In an alternate embodiment, the microprocessor 32 in progressive bonus apparatus 12 sends the progressive score total to the winning individual game unit 16 over a data bus, and the individual game unit 16 can then dispense the bonus award to the player.

Figure 4:
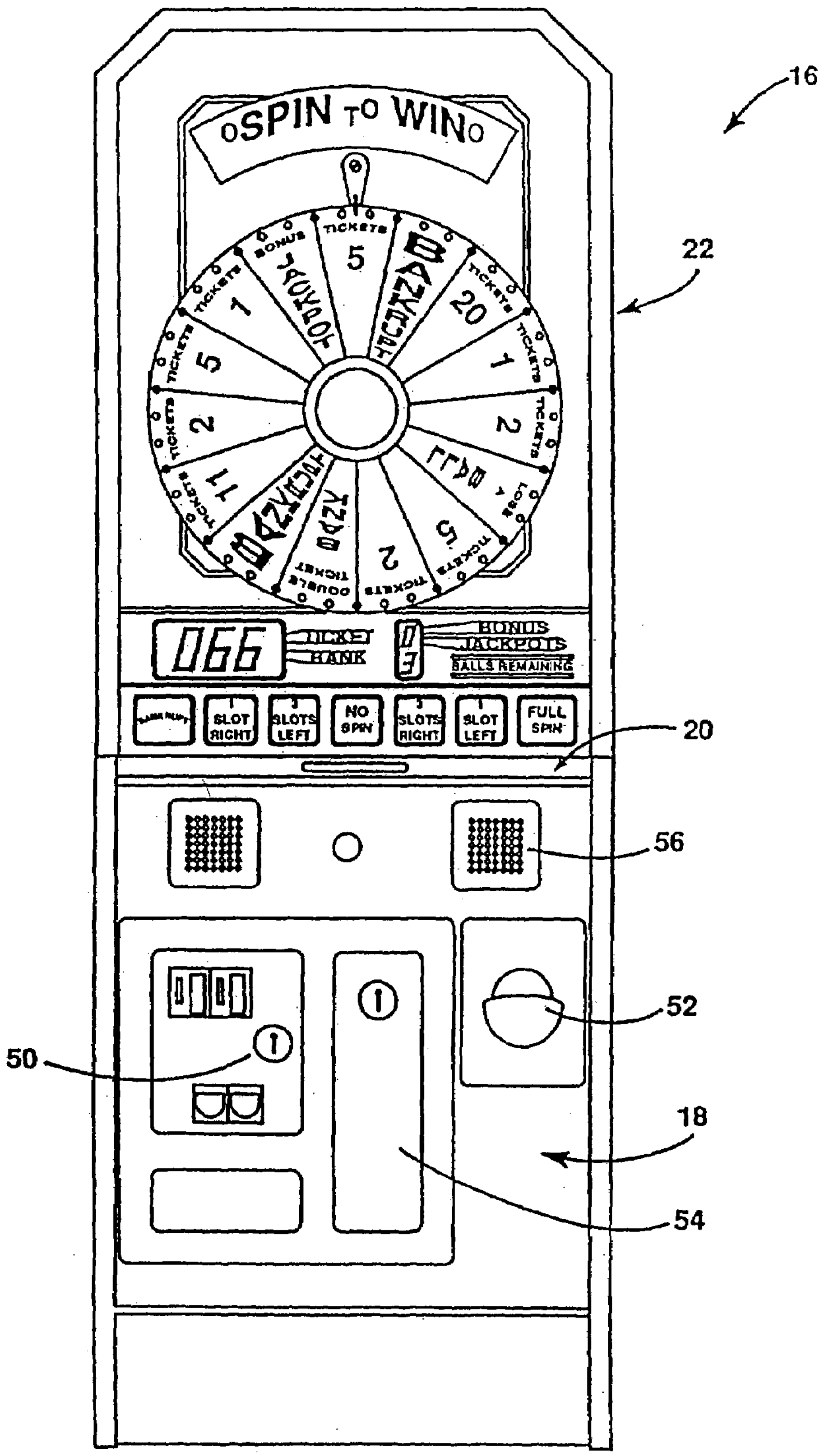
FIG. 4 is a front view of an individual game unit.

FIG. 4 is a front view of the preferred embodiment of an individual game unit. The game unit 16 comprises the front panel section 18, a playing surface 20, and the display section 22.

The front panel section comprises a coin deposit slot 50, a bail dispenser 52, a ticket dispenser 54, and a speaker 56. The coin deposit slot 50 may accept standard currency coins or game tokens that are normally available in an arcade environment, and also includes a coin return button and coin return slot. Coin boxes suitable for use in game unit 16 are readily available on the commercial market.

The ball dispenser 52 provides a ball for the player's use. In the preferred embodiment, the balls are rolled by the player down an inclined playing surface 20. Other types of playing pieces can also be used and directed down the playing surface, such as discs, cylinders, or other objects.

Figure 5:
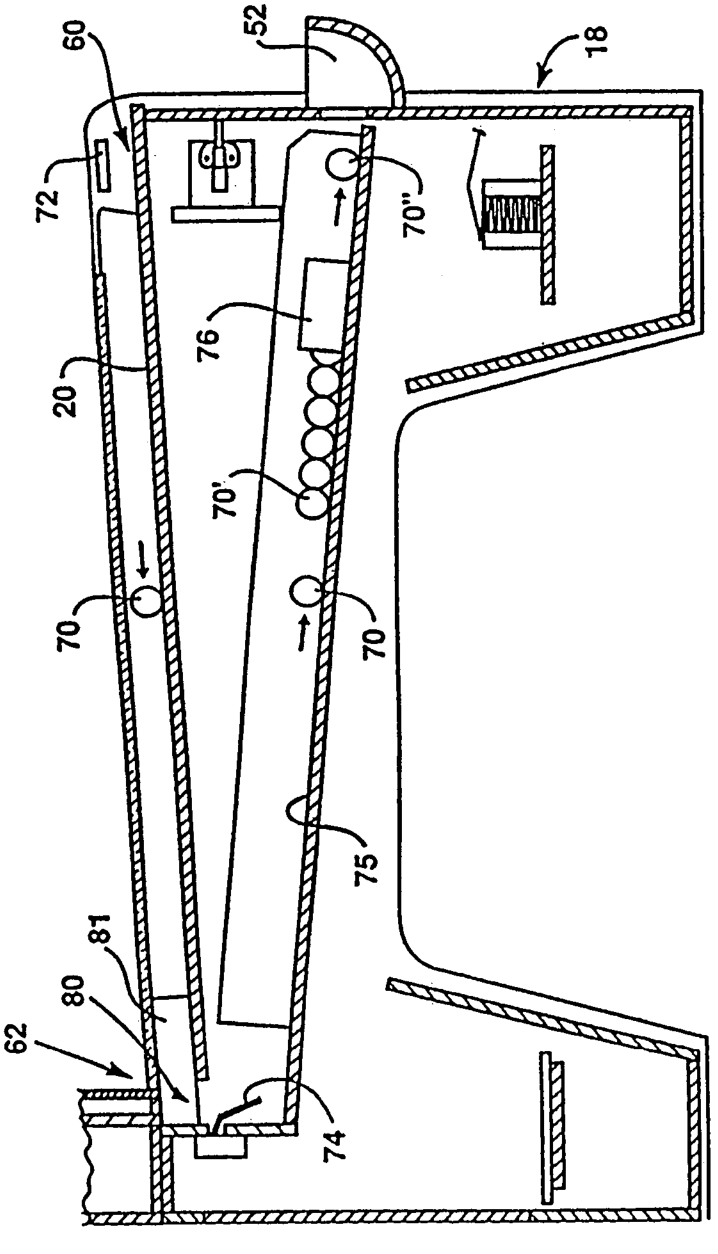
FIG. 5 is a side cross-section of the playing surface and playing piece return mechanism of an individual game unit.

The balls are dispensed to the player as shown in FIG. 5. The ball 70 is picked up by a player from the playing piece dispenser 52 and rolled down the playing surface 20 and through an opening 72 in the playing surface 20. The ball 70 then rolls down a ramp 75 to join other balls 70' which are held in a holding area 76. A solenoid within the holding area 76 ejects a ball 70" to roll into the playing piece dispenser 52, to be used by the player in the same way as the previous ball 70.

Referring again to FIG. 4, the ticket dispenser 54 dispenses a ticket award to the player based on the game score when the player has played all of the allotted bails 70 (typically balls). Other awards may be chosen by the game owner; possibilities include tickets that, when saved to some predetermined amount, are worth various prizes; or baseball or other sports cards could also be dispensed. The non-monetary award is stored in a storage area behind the front panel 18.

The speaker 56 emits sounds based on game actions and other game states and is controlled by the game unit controller system. The operation of the speaker will be discussed in greater detail subsequently.

Figure 6A:
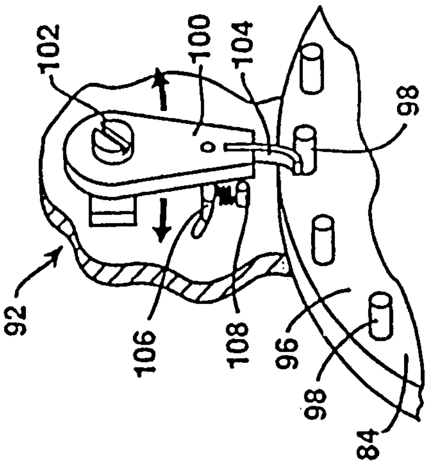
FIG. 6*a* is a detail view of the wheel scoring indicator.
Figure 6:
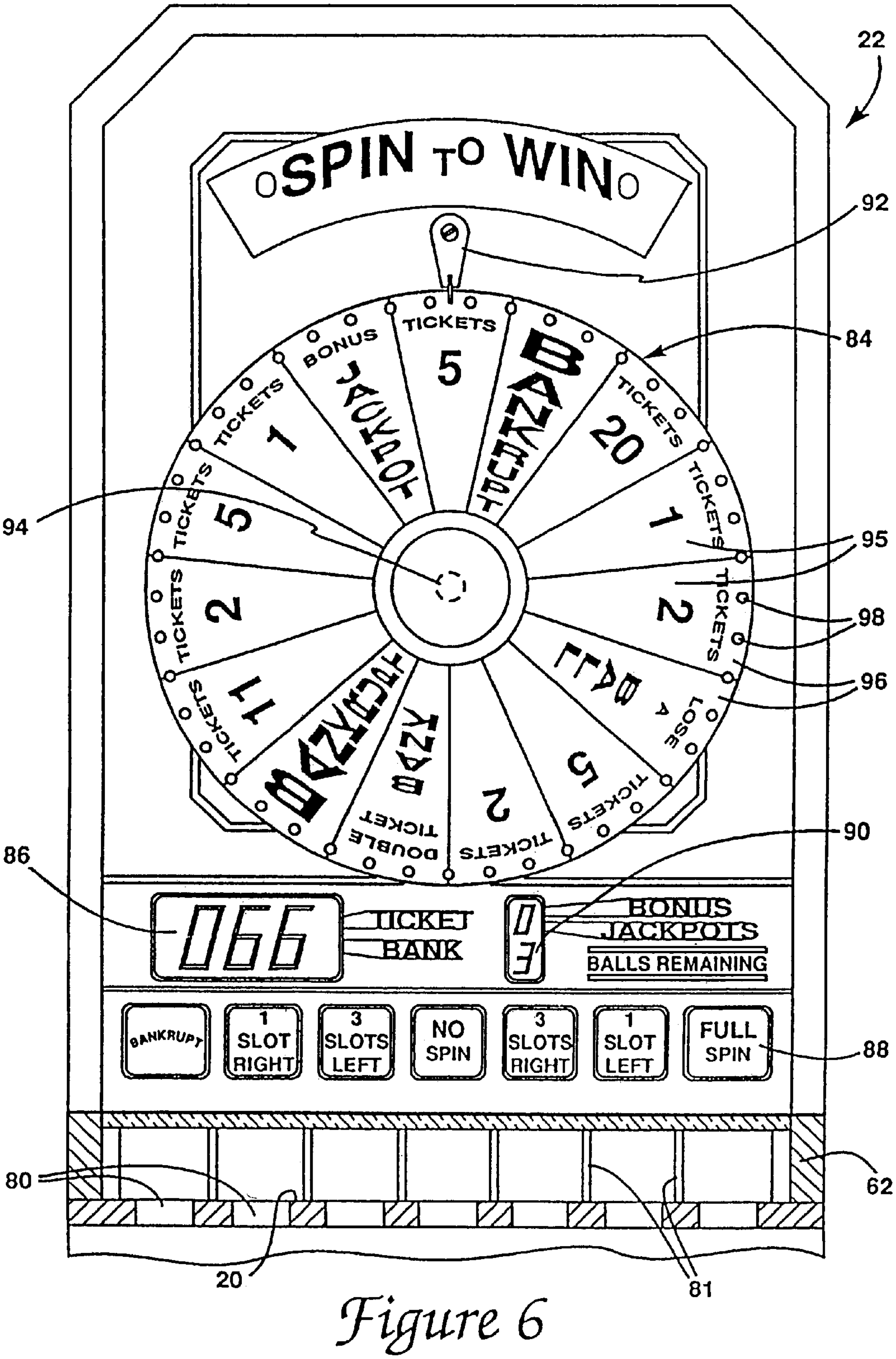
FIG. 6 is a detail view of the wheel, display, and target apertures of an individual game unit.

The playing surface 20 is shown in FIGS. 1, 5, and 6. It includes a player end 60 and a target end 62. Preferably, the surface 20 comprises a ramp where the target end 62 is lower than the player end 60. The player end 60 may include an opening 72 through which the player can drop the playing piece 70 onto the playing surface 20. The playing surface 20 is preferably a smooth, unobstructed surface; but it can also be provided with obstacles. The target end 62 includes a plurality of targets 80 that are receptive to the playing piece. In the preferred embodiment, the targets 80 are apertures, holes or slots that are associated with a switch 74 such that when the ball falls through a slot 80, the associated switch 74 is activated. Each slot 80 is defined by slot guide walls 81, which guide the ball into a particular target slot 80 to activate a switch 74. The guide walls 81 extend a short distance from the target end 62 onto the playing surface 20.

The display section 22 is shown in greater detail in FIG. 6. The display section 22 includes a wheel 84, a game score display 86, target displays 88, ball count display 90, and a pointer mechanism 92. This view also shows the target end 62 of the playing surface 20 as well as the targets 80. The wheel 84 is a flat circular disk that rotates on an axle 94. The wheel 84 is divided up into a number of segments 95, where each wheel segment 95 influences a specific game result, such as game score. Each wheel segment 95 is further divided into three sections 96 by section markers 98. These section markers 98 are short posts extending perpendicularly from the front surface of wheel 84 and engage pointer mechanism 92 as the wheel spins.

The game score display 86 is an LED display that indicates current game score to the player. Target displays 88 indicate the value or function of each individual target slot 80 to the player when a ball 70 is received by that target slot 80.

The ball count display 90 shows the status of playing pieces allotted to the player.

In the preferred embodiment, this display 90 shows the number of balls remaining for the player to use in the game.

The pointer mechanism 92 is further illustrated in FIG. 6*a*. In this figure, the pointer mechanism 92 consists of a base 100, an axle 102, a flexible pointer 104, and a detection mechanism 106. The flexible pointer 104 is made of a flexible rubber material and slows down the spinning wheel 84 by engaging each section marker 98 as the wheel 84 rotates. The base 100 pivots on the axle 102 to one side of a center post 108 every time a section marker 98 engages the flexible pointer 104. When the wheel 84 eventually stops rotating, the flexible pointer 104 is preferably pointing to a single section 96 between two section markers 98. At times it may occur that the flexible pointer 104 is pressed against a section marker 98 when the wheel 84 stops rotating, in this case, it is ambiguous at to which section 96 the pointing mechanism 92 is pointing. To prevent this result, a detection mechanism 106 will detect whenever the base 100 is not substantially vertical by detecting if the base 100 is pivoted to one side or the other and, if so, the direction of the pivot. If the base 100 is pivoted, the pointing mechanism 92 is assumed to be engaged with a section marker 98, so the microprocessor 110 directs a motor (described below) to rotate the wheel 84 slightly, in the opposite direction to the pivot, enough steps so that the pointing mechanism 92 disengages from the section marker 98.

FIG. 7 is a block diagram illustrating a preferred electrical system of a game unit 16. The system includes a power source 155, an LED printed circuit board (PCB) 152, a main PCB 157, and illumination lamps 158. The power source 155, in the preferred embodiment, is a commercially available 110 V AC power supply. The LED PCB 152 contains the main game score display 86 as well as the drivers for the motor that rotates the wheel 84. The main PCB 157 contains the major circuit components of the game unit 16, including the microprocessor, driver/buffers, amplifiers, and DIP switches (described in FIG. 8). Finally, the illumination lamps 158 illuminate indicators and other parts of the game unit.

FIG. 8 is a block diagram of a control system 119 on main board 157. The components include a microprocessor 110, RAM '112, ROM 114, a latch 116, DIP switches 118, latch 120, comparators 122, drivers 125, buffers 126, output switches 127, latches 140, lamp drivers 142, sound chip 144, low pass filter 146, audio amplifier 148, and speaker 150. The control system 119 is coupled to position detection mechanism 124, lamps 143, game score display board 152, and a motor 154.

The microprocessor 110 is preferably an Intel 8031 8-bit microprocessor, which has the range of features adequate for the task, including eight data lines and sixteen address lines. The microprocessor 110 is coupled to ROM 114 by a data/address/control bus 111. The ROM 114 is preferably an erasable, programmable read-only memory (EPROM) that contains the start-up instructions and operating system for the microprocessor 110. Microprocessor 110 is connected to RAM 112 by bus 111 to permit the use of RAM for scratch-pad memory. Methods for coupling ROM 114 and RAM 112 to the microprocessor 110 by bus 111 including enable, address, and control lines are well-known to those skilled in the art.

The microprocessor 110 is also coupled to a latch 116 and switches 118 by the bus 111. The switches 118 provide selectable functions that the owner of the game unit may change to his or her liking. These selectable functions include the values of the targets in terms of score, sound effects, progressive jackpot value (if present), the amount of any award given, the test mode, the type of game, and so on. Other selectable functions could also be set by the switches depending on how many selectable game options and features are desired. The switches 118 also include, in the present embodiment, the switches 74 that are activated when a playing piece 70 rolls into a target slot 80 on the playing surface 20.

The microprocessor 110 is also coupled to another latch 120, which is similar to the latch 116 that connects the switches 118 to the microprocessor 110. The latch 120 receives data from the comparators 122, which are set up in op amp configurations using an LM393 or similar device. These comparators 122 receive data from the position detection mechanism 124 indicating the position of the wheel 84, and output that data to the latch 120 and the microprocessor 110. The position detection mechanism 124 is discussed in greater detail below; see FIG. 9. The comparators 122 also receive a signal from the pointing mechanism 92 indicating if it is sitting on a section marker 98 or not, and sends that data to the latch 120 and microprocessor 110.

The microprocessor 10 is also coupled to the drivers 125 and the buffers 126. The buffers 126 receive data from many of the switches 127, including the coin switch 128, which detects if a coin has been inserted into the game unit 16, the test switch 132, which activates a test mode for the game unit 16; the credit switch 134, which, when pushed by a player, starts a game; and the ball release switch 138, which indicates to the microprocessor 110 if a playing piece 70 has actually been dispensed to the player. The drivers 125 activate the remaining switches 127, including the ticket drive 130, which activates the dispensing of the non-monetary award (in this case, tickets) out of the non-monetary award dispenser 54; and the solenoid 136, which pushes a ball 70 into the ball dispenser 52.

The microprocessor 110 is also coupled to the latches 140 which latch data for the lamp drivers 142. The lamp drivers 142 supply power to the lamps 143, which include the lights on the display section 22 of the game unit 16 that are not part of the game score display 86 or other numeric displays.

The microprocessor 110 is also coupled to a sound chip 148. This chip is an OKI Voice Synthesis LSI chip that has eight data input lines coupled to the microprocessor 110 by a latch 149. The sound chip 144 receives its data from ROMs (not shown) and outputs sound data to a low pass filter 146, an audio power amplifier 148, and finally to the output speaker 150, which generates sounds to the player playing the game unit 16.

The microprocessor 110 is also coupled to a separate printed circuit board 152 containing the game score display 86 and the motor controller 156, which controls the motor 154. The bus 111 connecting the microprocessor to the display board 152 are latched by a latch 153. Four of the ten connecting lines go to the game score display 86, which consists of 7-segment LED digit displays. The remaining lines control the motor controller 156. Motor 154 is preferably a stepper motor coupled to a stepper motor controller, as is well-known to those skilled in the art.

The control system 119 operates briefly as follows. The microprocessor 110 first reads the low memory from ROM 114 over bus 111 and sequences through the software instructions stored in ROM. The settings of DIP switches in the switches block 118 are also read into the microprocessor. The software from the ROM 114 then instructs the microprocessor 110 to send and receive data over the bus 111 in order to conduct a game. For example, when the coin switch 128 is activated, indicating a coin has been inserted into the game unit, the microprocessor reads a signal from the buffers 126 from bus 111. The microprocessor then sends a signal to the drivers 125 to activate solenoid 136 in order to dispense a ball 70 to the player. The ball release switch 127 sends a signal through the buffers 126 to the microprocessor, indicating that a ball has been dispensed. The microprocessor then awaits a signal from switches 118 that indicate which switch 74 in target slot 80 the ball 70 activated. The specific switch 118 signal determines what data the microprocessor will send to the motor 154 in order to rotate the wheel 84 a specific amount (see FIG. 9 for a detailed description of the motor and wheel rotation). The microprocessor then reads data from latch 120 which contains data from comparators 122 indicating which segment 95 the pointing mechanism 92 is pointing to. From this data the microprocessor can modify the game score by a specific amount and display the new score by sending a signal to game score display board 152. The microprocessor then dispenses another ball 70 and repeats the game process until all balls have been dispensed. During game play, the microprocessor sends appropriate output signals over bus 111 to activate speaker 150 and lamps 143 whenever game action occurs.

Figure 9:
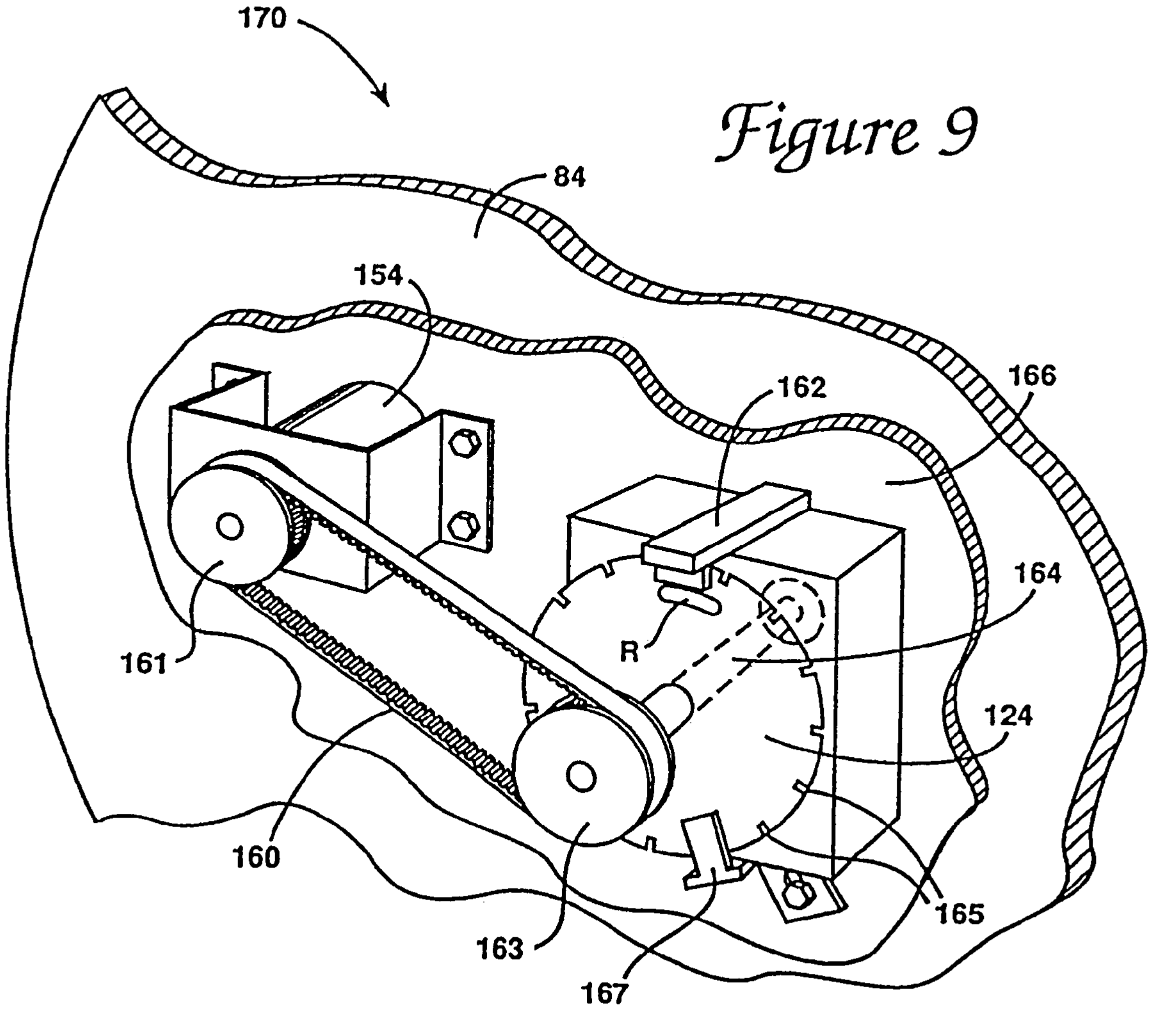
FIG. 9 is a perspective view of the wheel driving mechanism of an individual game unit including a preferred wheel position detector.

FIG. 9 shows the mechanism 170 to spin the wheel 84 and to detect its rotational position. Mechanism 170 is located on the backside 166 of the display section 22, behind wheel 84. The motor 154 is driven by a motor controller 156 on the game score display board 152, Axle 164 supports the wheel 84 for rotation. Motor 154 is connected to and rotates axle 164 by a toothed drive belt 160 and toothed pulleys 161 and 163 coupled to the shaft of motor 154 and to axle 164, respectively. Position detection wheel 124 contains notches 165 that correspond to the segments 95 on the wheel 84. The notches 165 are detected by optical detector 162 by sending a beam of light through a notch 165. If a notch 165 is aligned with the optical detector 162, pointer 104 is aligned with a segment 95.

The number of notches 165 that have passed through optical detector 162 as the position detection wheel 124 rotates can be counted by the microprocessor 110. If the original starting segment 95 of the wheel 84 was known, then the end segment 95 displayed on the wheel 84 can be deduced by counting the number of notches 165 that have passed through the optical detector 162. In this way, the microprocessor 110 knows what end segment 95 the pointing mechanism 92 is pointing to and knows how to affect the game score appropriately.

A wide reference notch R can provide an absolute position indication for the wheel 84. Wide notch detector 167 is an optical detector similar in design and function to detector 162, when the wide notch R is detected, a specific segment 95 on the wheel 84 is known to have rotated by pointing mechanism 92.

Figure 10:
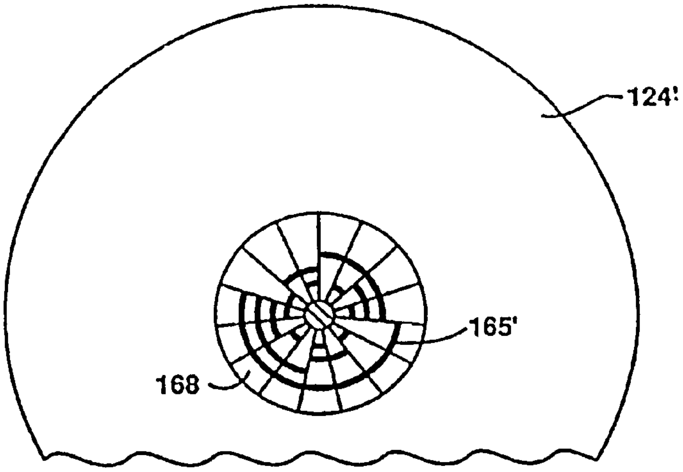
FIG. 10 is an alternate embodiment of a wheel position detector.

An alternate embodiment for wheel position detection is shown in FIG. 10. The position detection wheel 124' is not notched, but instead has optical bar code segments 165' that encode the segment positions 168 that correspond to the segments 95 on the front of the wheel 84. Specific segment 95 information is encoded in the segments 165' so that a wheel position may be known by reading the optical bar code segments 165' directly.

Figure 11:
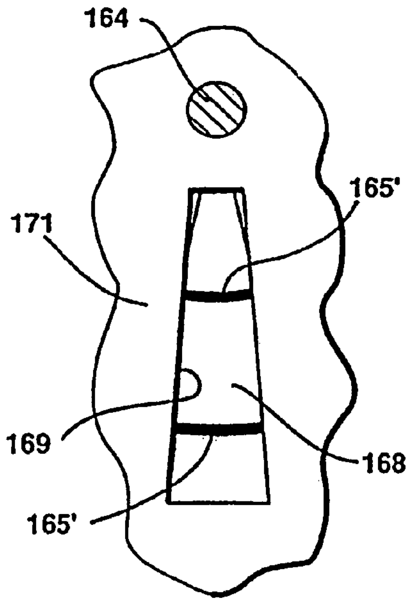
FIG. 11 is a detail view of the alternate wheel position detector of FIG. 10.

FIG. 11 shows a detail view of bar code segment 168 with optical bar code segments 165' being displayed through a slot 169 in a cover 171. The cover 171 serves to display only one bar code segment 168 width at a time.

Figure 12:
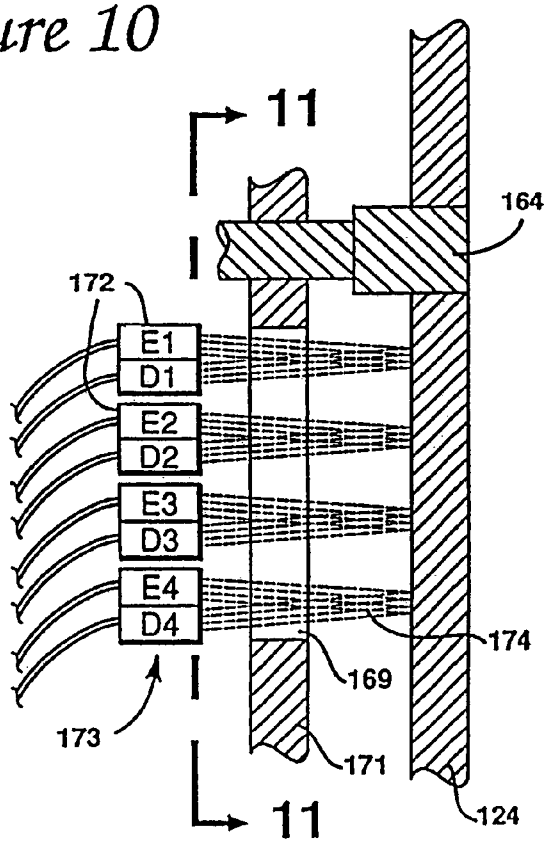
FIG. 12 is a cross sectional view of a reading mechanism for the alternate wheel position detector of FIGS. 10 and 11.

FIG. 12 shows a cross sectional of the wheel axle 164, position detection wheel 124', cover 171, and bar code reader 173. The bar code reader 170 consists of four emitter/detectors (E/D) 172. The emitter emits a beam of light 174 directed at the detection wheel 124', and the amount of light reflected back to the detectors determines whether the light 174 had impinged upon a bar code. Once the number of bar code segments 165' is known, the number is decoded as a binary number and the segment 95 is known. Since there are four emitter/detectors 172, up to $2^4-1=15$ positions can be encoded in this preferred embodiment, assuming that an all-blank bar code segment 168 is undesirable as being ambiguous.

The operation of the preferred embodiment of the gaming apparatus may be briefly described as follows: A player deposits a coin or token into coin slot 50 of game unit 16 to start the game. The wheel 84 is driven by the motor 154 to spin a random number of revolutions to begin a game. The pointing mechanism 92 keeps track of the end segment 95 at which the wheel 84 stops moving. A ball 70 is deposited to the player in ball dispenser 52. The player directs the ball 70 onto playing surface 20 at the player end 60 through an opening 72 in a cover protecting the playing surface 20. The ball 70 is rolled towards the target end 62 of the playing surface 20 towards the targets 80, which are slots for the ball 70 to roll into. The ball 70 rolls into a slot 80 marked, for example, “3 slots left”. The ball 70 activates a switch 74 below the slot 80 as it drops down to rolling surface 75. The ball 70 then rolls down ramp 75 to join a plurality of other balls 70' that are stored in a storage area 76, a microprocessor 110 signal then activates the solenoid 136 to dispense another ball 70" to the player if he or she has any playing pieces remaining to be played in his or her game.

Meanwhile, the switch 74 corresponding to the “3 slots left” slot 80 sends a signal to the microprocessor 110 which calculates the direction and the number of segments 95 the wheel 84 must be moved. The motor 154 turns the wheel 84 three segments 95 clockwise. The game then modifies the score or alters game conditions based upon the result displayed by that end segment 95. For example, suppose the end segment 95 displayed “5 tickets”. Five points would then be added to the game score, displayed on game score display 86. If the result “Bankrupt” were displayed, then the game score would be reset to zero.

One of the target slot designations might be “Full spin”. This would mean that a fast spin with a random result would be imparted on the wheel 84 by the motor 154. In order to keep track of the segment 95 the wheel 84 stops at, the position detection wheel 124 and optical detector 162 keep track of the amount of segments 95 that have rotated by so that the end segment 95 is calculated by the microprocessor 110. Alternatively, in the described alternate embodiment, the resulting segment 95 is read directly from bar code segments 165'.

The player will keep playing in this manner until he or she has used up his or her allotted amount of playing pieces. Once this occurs, the ticket dispenser 54 dispenses an award in relation to the player’s final game score. For example, if the final game score is 20, 20 tickets could be dispensed to the player.

Figure 13:
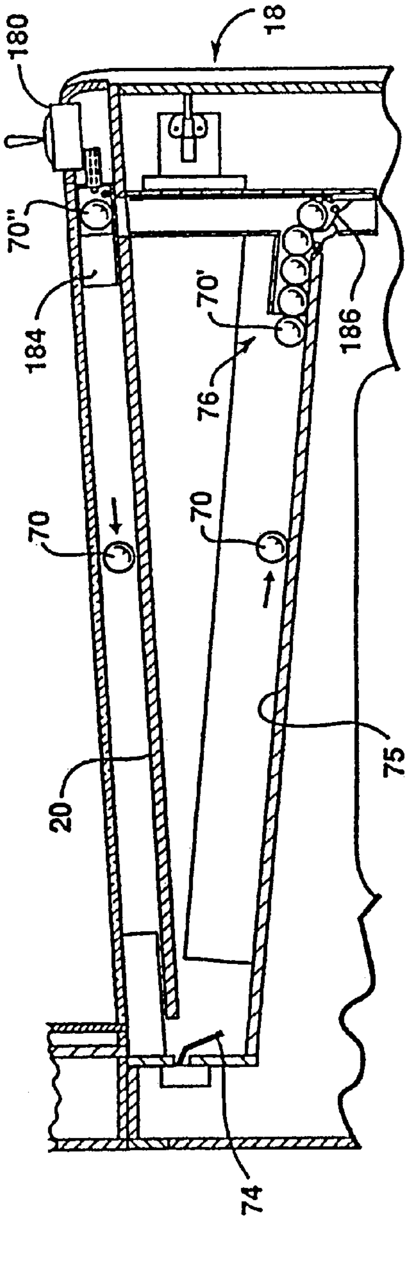
FIG. 13 is a cross-sectional view of the playing surface and playing piece return mechanism of an alternate embodiment of the present invention.

An alternate embodiment of the game unit is detailed in FIG. 13 in which there is no player contact with the ball 70. In this embodiment, the ball 70 is directed down the playing surface 20, its path being determined by controller 180, which might be a joystick controller as found on other arcade-type games. The controller 70 directs a guiding mechanism 184 left and right so that the player can decide to release the ball 70 when the guiding mechanism 184 is in position to release the ball 70 at a desired target. The ball 70 is directed down to the target end 62 and activates a switch 74 behind a specific target slot 80. The ball 70 then moves down ramp 75 to the holding area 76 where the other balls 70' are held, as in the previous embodiment. Meanwhile, switch 74 activates a rotating wheel and a score is determined; wheel mechanics and game score are achieved in a similar fashion to the embodiment described previously.

Figure 14:
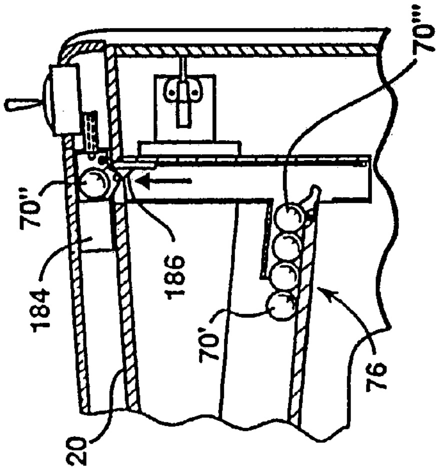
FIG. 14 is a detail view of the ball return mechanism of FIG. 13.

FIG. 14 illustrates the dispensing of a ball 70" to the guiding mechanism 184 in the alternate embodiment of FIG. 13. The ball 70" waits in holding area 76 on an elevator platform 186. When a previous ball 70 returns to holding area 76 and hits ball 70', elevator platform 186 moves upward by electrical motors, carrying ball 70". Elevator platform 186 stops moving when it is level with playing surface 20 and ball 70" is pushed through an opening in guiding mechanism 184 so that it rests in guiding mechanism 184. A player may now move and control the guiding mechanism 184 containing ball 70" using controller 180. Meanwhile, the elevator platform 186 moves down again to holding area 76 and the next ball 70''' moves onto it.

Figure 15:
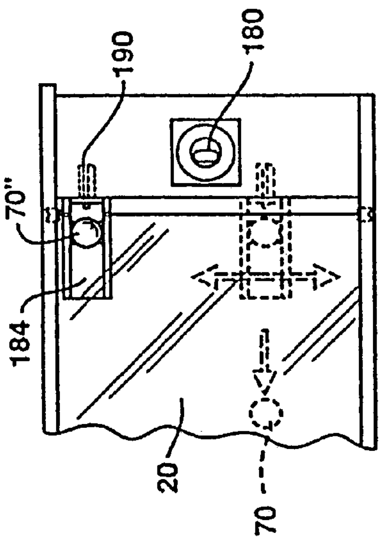
FIG. 15 is a partial top view of the playing surface of the alternate embodiment of FIG. 13.

FIG. 15 further illustrates the guiding mechanism 184. The guiding mechanism 184 is moved left and right as determined by controller 180. Controller 180 can control the guiding mechanism 184 by electrical signals and motors, or a mechanical system of gears, pulleys, etc. The guiding mechanism can also be controlled without a controller 180; for example, a player can move the guiding mechanism 184 manually by using a handle 190 attached to the guiding mechanism 184. The ball 70 is released from guiding mechanism 184 by activating a release control on the controller 180 when the guiding mechanism 184 is in the desired position. A solenoid or other electrical pushing mechanism can be used to eject the ball from the guiding mechanism, or an alternate method might be to use a mechanical release tab or spring to eject the ball 70 down the playing surface 20.

Figure 16:
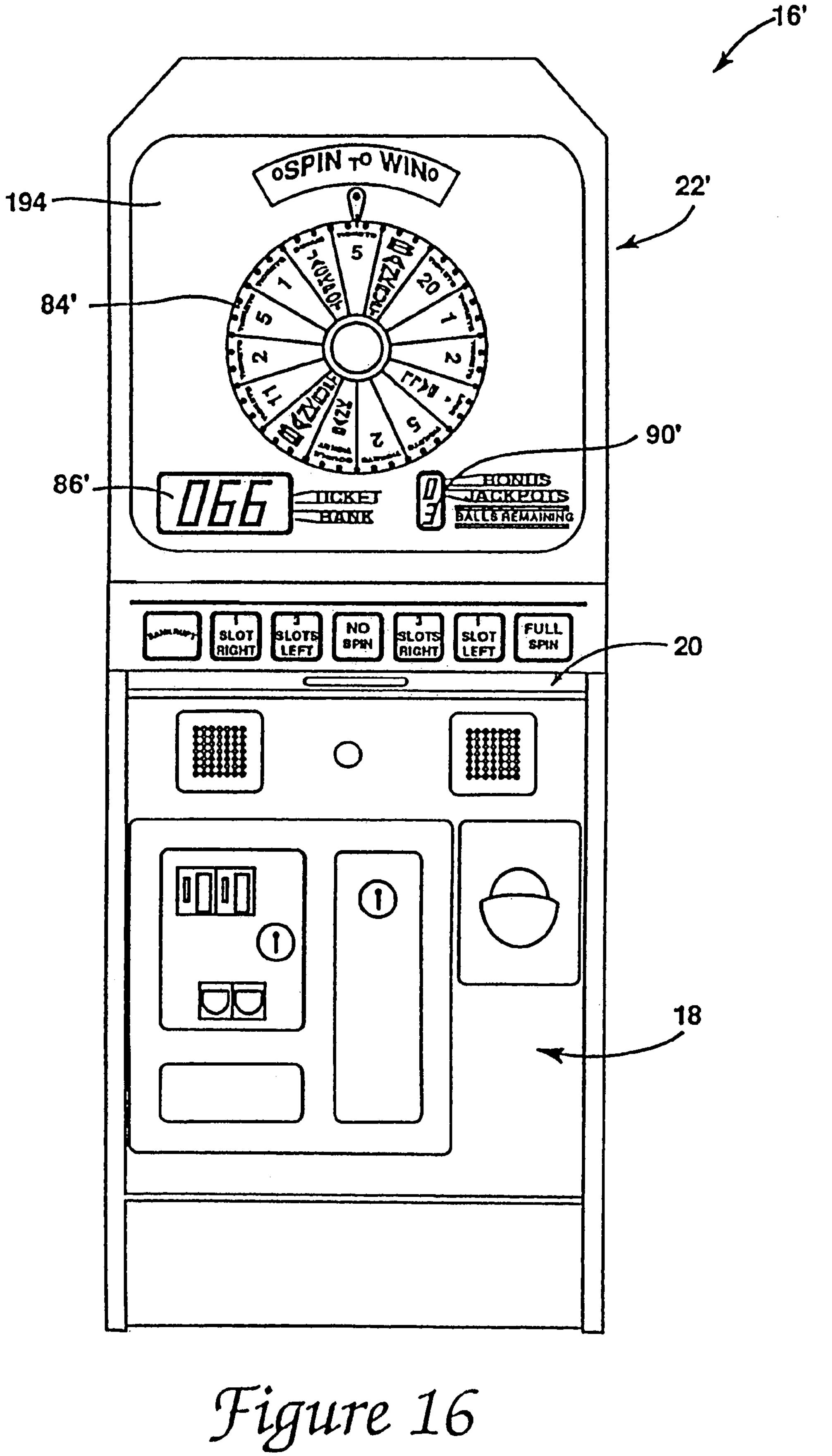
FIG. 16 is a front elevation view of an alternate embodiment of a game unit.

FIG. 16 shows a second alternate embodiment of the game unit 16. In this embodiment, game unit 16' includes a video screen 194 that preferably displays the same features of the display section 22 that were described in the initial embodiment of the application (see FIG. 6). Wheel 84', game score display 86' and ball count display 90' are graphical images on the video screen 194 and are controlled and updated completely by internal components (see FIG. 17). Each component of the display area 22' serves similar functions in game play as like areas did in the previous embodiments.

Figure 17:
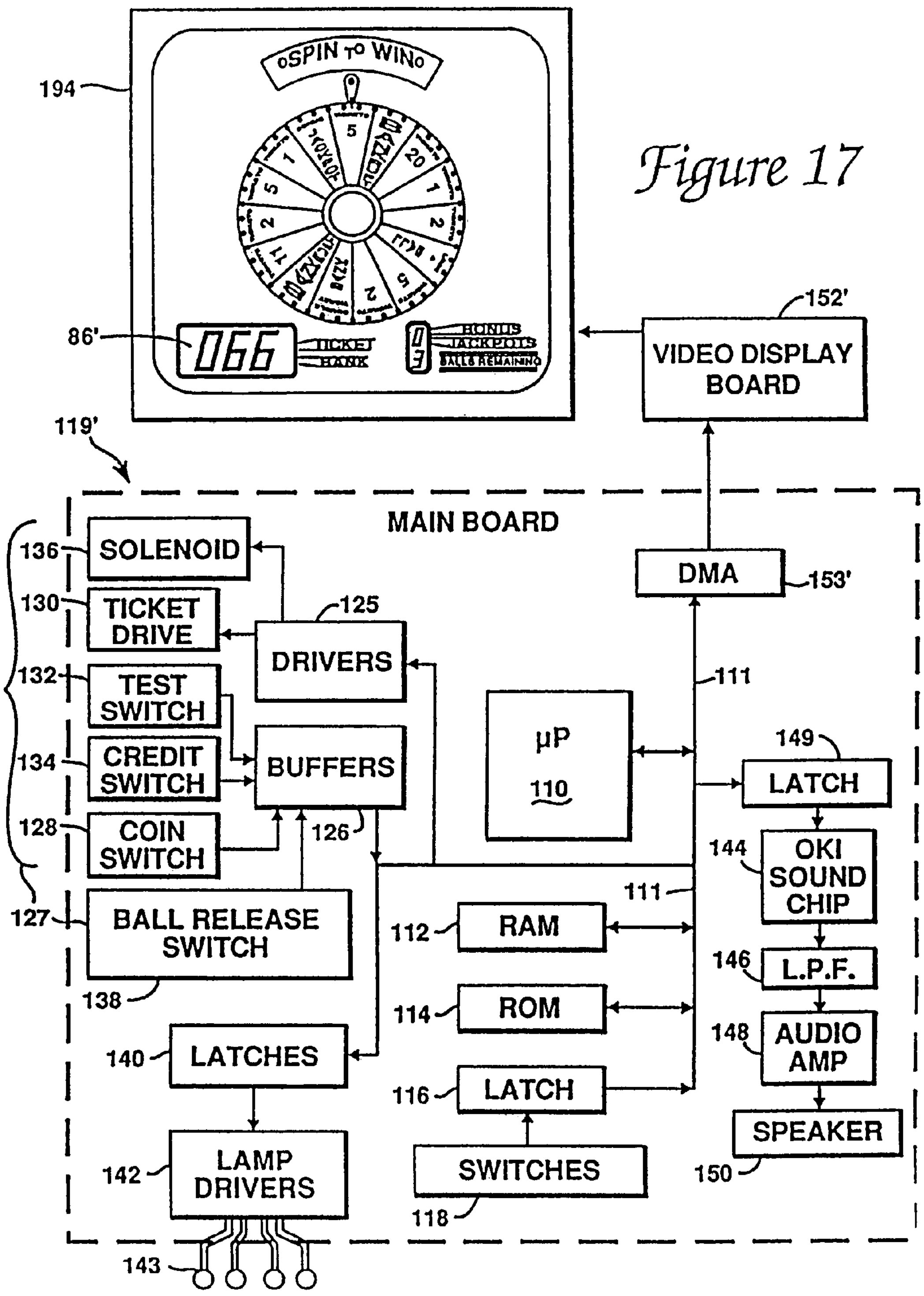
FIG. 17 is a block diagram of the electronic components used in the game unit of FIG. 16.

FIG. 17 is a block diagram of the control system 119' of the alternate embodiment of the game unit 16' shown in FIG. 16. The components of the control system 119' are similar to those described in the previous embodiment in FIG. 8, except for the components that relate to the game display 22'. Video display board 152' is coupled to direct memory access (DMA) 153', which is coupled to the microprocessor 110 and ROM 114 by bus 111. Video monitor 194 is coupled to a video display board 152'. The video display board 152' contains the control circuitry needed to create a graphical output on the video monitor 194 using control signals and data from the microprocessor 110. In this embodiment, microprocessor 110 is preferably a graphics-oriented microprocessor, so that the wheel and score images on the video monitor 194 have good resolution. The video images on video monitor 194 are moved and updated using software techniques well-known to those skilled in the art.

While this invention has been described in terms of several preferred embodiments, it is contemplated that alterations, modifications and permutations thereof will become apparent to those skilled in the art upon a reading of the specification and study of the drawings. For example, the playing surface 20 of the game unit 16 can be situated horizontally. The playing surface 20 can also be angled such that the target end 62 is higher than the player end 60.

It is therefore intended that the following claims include all such alterations, modifications and permutations as fall within the spirit and scope of the present invention.

What is claimed is:

1. A game system, the game system comprising:

a plurality of physically separated player-machines, wherein each physically separated player-machine includes its own microprocessor and software for allowing a player to play at least one game that requires sufficient skill such that it is not primarily a game of chance, wherein said player is entitled to play said at least one game due to an economic consideration, and is adapted for developing digital information resulting from play of said at least one game, and wherein each player-machine includes a wheel-shaped indicator having a plurality of segments, and wherein each segment of the plurality of segments of the wheel-shaped indicator is individually detectable by a detector of each player-machine;

a bonus apparatus including a microprocessor and software, physically separated from said plurality of player-machines and coupled with said plurality of player-machines for digital communication therewith, wherein said digital communication includes game information and award information associated with said at least one game wherein said award information may be generated based on two or more differing non-monetary criteria from said at least one game played at a player machine of the plurality of player machines.

2. The game system as recited in claim 1, further comprising a network coupling said plurality of player-machines to said bonus apparatus.

3. The game system as recited in claim 2, wherein said network includes a serial transmission protocol.

4. The game system as recited in claim 3, wherein said serial transmission protocol is an RS-232 protocol.

5. The game system as recited in claim 1, wherein said bonus apparatus provides awards based on one or more criteria, selected from a group consisting essentially of:

a game result;

a progressive score;

a completion of a specific task;

an attainment of a specific goal; and a number of players playing.

6. The game system as recited in claim 5, wherein said progressive score is associated with a progressive bonus that is based on contributions made by said plurality of physically separated player-machines, and wherein said progressive score can be incremented or decremented based on a multiplier associated with said contributions.

7. The game system as recited in claim 6, wherein said contributions are based on one or more events, said one or more events comprising: consideration generated from at least one of said plurality of physically separated player-machines; and attainment of at least one pre-determined goal by at least one player playing at said plurality of physically separated player-machines.

8. The game system as recited in claim 1, wherein said bonus apparatus provides non-monetary awards.

9. A method for a game system, the method comprising:

allowing a player to play at least one game that requires sufficient skill such that said at least one game is not primarily a game of chance, said at least one game being played on one of a plurality of physically separated player-machines in said game system, wherein each physically separated player-machine includes its own microprocessor and software for allowing said player to play said at least one game, where each of said plurality of physically separated player-machines is adapted to develop digital information resulting from play of said at least one game and for being in digital communication with other physically separated player-machines, wherein said player is entitled to play said at least one game due to an economic consideration;

spinning a wheel-shaped indicator at each player-machine as part of allowing a player to play at least one game, the wheel-shaped indicator having a plurality of segments;

detecting each segment of the plurality of segments of the wheel-shaped indicator at each player-machine using a detector at the player-machine;

digitally communicating with a bonus apparatus including its own microprocessor and software by said plurality of physically separated player-machines wherein said bonus apparatus is physically separated from said plurality of physically separated player-machines, and wherein said digital communication includes game information and award information associated with said at least one game wherein said award information may be generated based on two or more differing non-monetary criteria from said at least one game played at a player machine of the plurality of player machines.

10. The method as recited in claim 9, wherein said digital communication is over a network.

11. The method as recited in claim 10, wherein said network includes a serial transmission protocol.

12. The method as recited in claim 11, wherein said serial transmission protocol is an RS-232 protocol.

13. The game system as recited in claim 1, wherein the each physically separated player-machine is parallel-coupled to the bonus apparatus.

14. The method as recited in claim 9, wherein the each physically separated player-machine is parallel-coupled to the bonus apparatus.

* * * * *